(12) United States Patent
Sinclair et al.

(10) Patent No.: US 8,160,735 B2
(45) Date of Patent: Apr. 17, 2012

(54) METHOD OF GENERATING RECIPE FOR PROCESS

(75) Inventors: Paul Andrew Sinclair, Chesham (GB); James Roy Savery, Chesham (GB)

(73) Assignee: BioPharm Services Limited, Chesham, Buckinghamshire (GB)

( * ) Notice: Subject to any disclaimer, the term of this patent is extended or adjusted under 35 U.S.C. 154(b) by 232 days.

(21) Appl. No.: 12/712,737

(22) Filed: Feb. 25, 2010

(65) Prior Publication Data

US 2010/0217420 A1  Aug. 26, 2010

(30) Foreign Application Priority Data

Feb. 26, 2009 (GB) .................................. 0903347.3

(51) Int. Cl.
*G06F 19/00* (2011.01)
(52) U.S. Cl. .................. 700/103; 700/100; 700/106
(58) Field of Classification Search ............ 700/97, 700/99, 100, 101, 103, 106
See application file for complete search history.

(56) References Cited

U.S. PATENT DOCUMENTS

| | | | |
|---|---|---|---|
| 5,499,188 | A | 3/1996 | Kline et al. |
| 6,697,690 | B2 | 2/2004 | Scholl et al. |
| 6,834,370 | B1 | 12/2004 | Brandl et al. |
| 6,907,308 | B1 | 6/2005 | Bartlett et al. |
| 6,947,917 | B1 | 9/2005 | Mathur et al. |
| 7,047,101 | B1 | 5/2006 | Young et al. |
| 7,065,714 | B1 | 6/2006 | Theel et al. |
| 7,181,303 | B2 | 2/2007 | Scholl et al. |
| 7,283,882 | B1 | 10/2007 | Bransky et al. |

(Continued)

FOREIGN PATENT DOCUMENTS

EP  1 150 206 A1  10/2001

(Continued)

OTHER PUBLICATIONS

"Enterprise-Control System Integration Part 1: Models and Terminology," American National Standard, ANSI/ISA-095.00-01-2000, Approved Jul. 15, 2000 (142 pages).

(Continued)

*Primary Examiner* — Sean Shechtman
(74) *Attorney, Agent, or Firm* — Finnegan, Henderson, Farabow, Garrett & Dunner, LLP

(57) ABSTRACT

A method of generating a general recipe for an industrial process that is not site or resource specific to from a master recipe that is site and resource specific, comprises:
a) deleting any process elements of the master recipe that are support segments that relate only to resources assigned to the master recipe;
b) creating records in the general recipe for any process properties that are designated as not site specific;
c) creating records of resource requirements and requirement groups for process elements associated with such resource requirements; and
d) determining scheduling relationships for the process elements of the general recipe so generated by:
  (i) determining which process elements are primary and which are secondary;
  (ii) determining the processing relationship of other process elements with respect to primary process elements; and
  (iii) storing data defining whether the processing relationships are general or site specific.

21 Claims, 18 Drawing Sheets

U.S. PATENT DOCUMENTS

| | | |
|---|---|---|
| 7,292,906 B2 | 11/2007 | Funk et al. |
| 7,369,913 B2 | 5/2008 | Heminway et al. |
| 2003/0196186 A1 | 10/2003 | Scholl et al. |
| 2004/0054645 A1 | 3/2004 | Scholl et al. |
| 2004/0187093 A1 | 9/2004 | Hogan |
| 2006/0020362 A1 | 1/2006 | Morinaga et al. |
| 2006/0259160 A1 | 11/2006 | Hood et al. |
| 2007/0156275 A1 | 7/2007 | Piper et al. |
| 2007/0192056 A1 | 8/2007 | Ahmed et al. |
| 2007/0283030 A1 | 12/2007 | Deininger et al. |
| 2008/0015714 A1 | 1/2008 | Rudnick et al. |
| 2008/0097636 A1 | 4/2008 | Kline |
| 2008/0127186 A1 | 5/2008 | Kanodia et al. |
| 2008/0134073 A1 | 6/2008 | Bergantino et al. |
| 2008/0154412 A1* | 6/2008 | Steinbach et al. .............. 700/97 |

FOREIGN PATENT DOCUMENTS

| | | |
|---|---|---|
| EP | 1 865 413 A1 | 12/2007 |
| GB | 2 453 053 A | 3/2009 |
| WO | WO 2009/016090 A1 | 2/2009 |

OTHER PUBLICATIONS

"Enterprise-Control System Integration Part 2: Object Model Attributes," American National Standard, ANSI/ISA-95.00.02-2001, Approved Oct. 17, 2001 (104 pages).

"Batch Control—Part 2: Data Structures and Guidelines for Languages," British Standards Institution, BS EN 61512-2:2002, Oct. 2002 (108 pages).

Miller, "Things Go Better with S88: A New Approach to the Engineering Process", Pharmaceutical Engineering, 12 pages, (Sep. 2002).

American National Standard, "Batch Control Part 1: Models and Terminology", ANSI/ISA—S88.01-1995, pp. 1-96, (Oct. 23, 1995).

American National Standard, "Batch Control Part 2: Data Structures and Guidelines for Languages", ANSI/ISA—S88.00.02-2001, pp. 1-124, (Feb. 7, 2001).

American National Standard, "Batch Control Part 3: General and Site Recipe Models and Representation", ANSI/ISA—88.00.03-2003, pp. 1-80, (Mar. 14, 2003).

* cited by examiner

FIG. 9

| Unit Operation<br>Protein-A | Operation<br>Load-Elute | Action<br>Elute Product | Recipe<br>"Original" Master Recipe |
|---|---|---|---|

Process Parameters

| Parameter | Target Value |
|---|---|
| Bed Height (cm) | 14 |
| Bed Volume (L) | 17.59 |
| Product Fraction (L) | 4.02 |
| Product Fraction CVs | 0.23 |
| Buffer Volume (L) | 70.37 |
| Buffer CVs | 4.00 |
| Linear Flowrate (cm/hr) | 75.00 |
| Volumetric Flowrate (L/hr) | 94.25 |
| Step Duration (hr) | 0.75 |
| Waste Volume (L) | 66.35 |
| Waste CVs | 3.77 |

Process Requirements

| Class | Type | Specifications | Value |
|---|---|---|---|
| None specified! | | | |

Assignments

| Class | Type | Properties | Value |
|---|---|---|---|
| Equipment | Chromatography Column | Supplier | GE Healthcare |
| | | Name | Column #1234 |
| | | Column Height (cm) | 13-15 |
| | | Column Diameter (cm) | 40 |
| Equipment | Chromatography Controller | Supplier | GE Healthcare |
| | | Name | Suite X Chromo Skid1 |
| | | Operational Flowrate (L/hr) | 20-150 |
| Consumables | Protein-A Resin | Supplier | GE Healthcare |
| | | Name | Mab Select |
| Materials | Buffer Solution | Name | Protein-A Elution Buffer |

| Unit Operation | Operation | Action | Recipe |
|---|---|---|---|
| Protein-A | Load-Elute | Elute Product | "General" Recipe |

Process Parameters

| Parameter | Target Value |
|---|---|
| Bed Height (cm) | 14 |
| Bed Volume (L) | |
| Product Fraction (L) | |
| Product Fraction CVs | 0.23 |
| Buffer Volume (L) | |
| Buffer CVs | 4.00 |
| Linear Flowrate (cm/hr) | 75.00 |
| Volumetric Flowrate (L/hr) | |
| Step Duration (hr) | |
| Waste Volume (L) | |
| Waste CVs | 3.77 |

Process Requirements

| Class | Type | Specifications | Value |
|---|---|---|---|
| Equipment | Chromatography Column | Column Height (cm) | 13-15 |
| Equipment | Chromatography Controller | | |
| Consumables | Protein-A Resin | Supplier | GE Healthcare |
| | | Name | Mab Select |
| Materials | Buffer Solution | Name | Protein-A Elution Buffer |

Assignments

| Class | Type | Properties | Value |
|---|---|---|---|
| No assignments in general recipe! | | | |

| Unit Operation<br>Protein-A | Operation<br>Load-Elute | Action<br>Elute Product | Recipe<br>"New" Master Recipe |
|---|---|---|---|

Process Parameters

| Parameter | Target Value |
|---|---|
| Bed Height (cm) | 14 |
| Bed Volume (L) | 281.49 |
| Product Fraction (L) | 64.32 |
| Product Fraction CVs | 0.23 |
| Buffer Volume (L) | 1125.92 |
| Buffer CVs | 4.00 |
| Linear Flowrate (cm/hr) | 75.00 |
| Volumetric Flowrate (L/hr) | 1508.00 |
| Step Duration (hr) | 0.75 |
| Waste Volume (L) | 1061.60 |
| Waste CVs | 3.77 |

Process Requirements

| Class | Type | Specifications | Value |
|---|---|---|---|
| Equipment | Chromatography Column | Column Height (cm) | 13-15 |
| Equipment | Chromatography Controller | | |
| Consumables | Protein-A Resin | Supplier | GE Healthcare |
| | | Name | Mab Select |
| Materials | Buffer Solution | Name | Protein-A Elution Buffer |

Assignments

| Class | Type | Properties | Value |
|---|---|---|---|
| Equipment | Chromatography Column | Supplier | GE Healthcare |
| | | Name | Column #XYZ |
| | | Column Height (cm) | 13-15 |
| | | Column Diameter(cm) | 160 |
| Equipment | Chromatography Controller | Supplier | GE Healthcare |
| | | Name | Suite Y Chromo SkidB |
| | | Operational Flowrate (L/hr) | 750-1500 |
| Consumables | Protein-A Resin | Supplier | GE Healthcare |
| | | Name | Mab Select |
| Materials | Buffer Solution | Name | Protein-A Elution Buffer |

METHOD OF GENERATING RECIPE FOR PROCESS

This invention relates to recipes for industrial processes, and especially to the generation of recipes for batch processes, for example employed in biopharmaceutical processes.

The invention is concerned especially with the generation and modification of recipes for batch control used in manufacturing operations that are described by ANSI/ISA-S88.01 and ANSI/ISA-95 and the European equivalent IEC 61512-01. This standard defines a number of hierarchical models for batch processes with the intention inter alia of reducing the time taken to reach production levels for new products, reducing the costs of automating manufacturing processes and improving operational efficiencies.

In the recipe model, the standard describes batch processes in the form of a process hierarchy in which, in the highest level of the hierarchy, a number of different products may be specified in a "process family". Below the process family, a number of processes are specified for each process family, each process being associated with a recipe for producing one product of the product family. The recipe will include a number of recipe elements, each forming part of the process and comprising one or more process elements of varying complexity, for example process elements referred to as "unit operations", "operations" and "actions", that form the recipe. The unit operations are the more complex procedures forming the recipe and may, for example, comprise inoculum preparation, seeding a sample, fermentation and batch fermentation, centrifugation, harvesting the product, filtration of the product, chromatography, viral inactivation, viral filtration, ultrafiltration, sterile filtration, depth filtration, biocatalysis, two phase separations, cell lysis, homogenisation and final filling. Each unit operation may be broken down into a number of operations of lesser complexity than the unit operations, such as setup of the equipment, loading and eluting the equipment, processing, post processing, and sanitisation. Below the level of operations comes "actions" which are relatively simple steps such as equilibration of a system, loading with reactants, washing, elution, regeneration, centrifuging, adjusting pH, clean-in-place (CIP) and the like.

In addition to the process steps forming the recipe, the recipes may call on equipment, materials, consumables, streams and personnel. The separation of product information from production equipment capability enables the same equipment to be employed to make a number of products or to perform different operations on the same product. The equipment may be specified as part of a facility hierarchy that may comprise at its highest level a number of areas that may for example have required levels of manufacturing suites, warehousing areas, laboratory areas, cleaning areas, utility areas, support areas, material halls, preparation areas, stores and the like. The areas may be divided into a number of process cells, each of which may typically be located in one room of a facility, and is a grouping of equipment required for the production on one or more batches. A process cell may simultaneously run one or more batches and usually defines the factory resource used in scheduling, and may, for example, define equipment to be used for media preparation, production, harvesting, pre- and post-viral purification, aseptic filling etc. The process cells may be divided into a number of "units", each unit being a collection of process equipment, control equipment and the associated control logic that performs one or more of the processing activities, for example fermenting or reaction. In general each unit can operate only on one batch at a time. Below the level of unit are equipment modules, each of which is a functional group of equipment items that can perform a number of specific, minor processing activities such as dosing, weighing, fermenting, feeding and the like.

As defined in the S88 standard, there are four types of recipes, each recipe having a different purpose from the others. One such recipe is called the "general recipe", often referred to as an equipment-independent recipe, and is generated for each product variant that is produced. The general recipe defines the material and process dependencies required to make the product in such a way that it is independent of the site at which the product is manufactured and the scale of manufacture, the specific equipment employed in the manufacture, the materials (unless any specific designation is required for the manufacture), consumables and personnel. The general recipe is usually created during pilot plant scale-up of a recipe used for R&D. In addition to the general recipe, a "site recipe" may be maintained for each manufacturing site at which the product is made. The site recipe may specify local materials, and may correspond to a general recipe that is modified for language and local units of measurement. A "master recipe" is usually generated for each process cell and for each product variant, and may define exactly how the product is to be made in the process cell based on the units in the cell, material flows between units and the equipment available. In addition to the recipes described above, a control recipe may be generated for each batch and may describe custom options and formula values for a specific batch. Of these recipes, the most important are the general recipe and the master recipe.

It should be appreciated that different terminology is often employed for the various process elements in the recipes, and that ISA S88 does not use consistent terminology as between master and general recipes. The terms as used herein are defined as follows:

| Herein | S88 General Recipe | S88 Master recipe |
| --- | --- | --- |
| Process | General Recipe Procedure | Recipe procedure |
| Unit Operation | General Recipe Process Stage | Recipe Unit Procedure |
| Operation | General Recipe Process Operation | Recipe Operation |
| Action | General Recipe Process Action | Recipe Phase |

The conversion of general recipes to master recipes is described in ANSI/ISA 588.03 section 8.1 which states:

"Process engineers use the information from an equipment-independent recipe to construct one or more master recipes for each process cell. This transformation takes the process definition defined in the equipment independent recipe and maps it to the specific equipment available in the process cell. The equipment-independent recipes provide the basic information that is required to build master recipes.

Transformation is performed as a set of engineering tasks, usually with formal definitions and processes. Transformation can be an entirely manual process, a partially automated process, or an entirely automated process depending on the availability of formal definitions and appropriate tools."

No process for conversion of a master recipe employed in a production facility to a general recipe, however, is described in ISA S88. The only use of a master recipe for the generation of a general recipe that is described is the use of trial recipes for the generation of the initial general recipe during pilot plant development, and there is no suggestion that the generation of the general recipe can be automated or how this should be done. One problem with the generation of recipes is that it is natural for people to think in terms of physical quantities, equipment and the like, so that master recipes tend to be created ab initio rather than indirectly via any general recipes. In addition, without the ability to form a general recipe from a master recipe, it is not possible in any easy or automated way to convert one master recipe that is appropriate for one site to another master recipe that is appropriate to a different site.

The present invention provides an abstraction method in which the master recipe may be converted to a general recipe. According to one aspect, the present invention provides a method of generating a general recipe that comprises process elements describing an industrial process that is not specific to a site and scale of operation at which the process is conducted, or to consumables, equipment, personnel or materials employed in the process, from a master recipe that comprises process elements of the industrial process that is specific to the site and/or scale of operation or to consumables, equipment or personnel, the master recipe comprising records defining process elements forming the process, the method comprising:

a) determining whether a process element of the master recipe is a support segment that relates only to resources assigned to the master recipe, the resources being consumables, personnel, material, or equipment used in the process, and generating a record in the general recipe for each process element of the master recipe that is not a support segment;
b) for each process element of the master recipe that corresponds to a process element of the general recipe, that is to say, for each process element of the master recipe that is not a support segment:
  (i) determining whether or not a process property of that process element (for example the volume of buffer, or growth time of a cell culture) is designated in the master recipe as a general property, that is to say a property which is specified in a general recipe and which, where possible is independent of the facility or scale, and if so, calculating a process property value for that process property that is not specific to the site, scale of operation, or assigned resources, or prompting the user to input a value for the property, the process properties comprising properties relating to personnel, equipment, environment, materials and/or consumables;
  (ii) creating a record of the process property value so calculated or input; and
  (iii) repeating steps (i) and (ii) for each process property of that process element;
c) determining whether the process element of the master recipe is associated with a record defining the resource requirements of that process element, and if so, creating in the general recipe a record of a requirement group, that is to say, a set of requirements that are specific to the process activity, and of each requirement in the group;
d) repeating steps a) to c) for each record defining a process element in the master recipe;
e) determining scheduling relationships for a process element of the recipe so generated by the steps of:
  (i) determining whether the process element is a primary process element whose scheduling is not dependent on any secondary process element, or a secondary process element whose scheduling is dependent on a primary processing element;
  (ii) if it is determined that the process element is a primary process element, then determining the processing relationship of another process element of the master recipe with respect thereto other than any process element of the master recipe that is designated in the master recipe as a support segment;
  (iii) determining whether or not the processing relationship is designated in the master recipe as a general relationship, that is to say, a relationship that does not depend on any site specific operational requirements, and, if so, storing data defining the processing relationship in a process/dependencies record of the general recipe; and
  (iv) repeating steps (i) to (iii) for each process element in the general recipe.

According to another aspect, the invention provides a device for generating a general recipe that comprises process elements describing an industrial process that is not specific to a site at which the process is conducted and scale of operation, or to consumables, equipment or personnel employed in the process, from a master recipe that comprises process elements of the industrial process that is specific to the site and scale of operation or to consumables, equipment or personnel, the master recipe comprising records defining process elements forming the process, the device comprising:

a) a module for determining whether a process element of the master recipe is a support segment that relates only to resources assigned to the master recipe, the resources being consumables, material, or equipment used in the process, and generating a record in the general recipe for each process element of the master recipe that is not a support segment;
b) a module that is operable to read the record of each process element of the master recipe that corresponds to a process element of the general recipe, and is operable:
  (i) to determine whether or not a process property of that process element is designated in the master recipe as a general property, and if so, to calculate a process property value for that process property that is not specific to the site, scale of operation, or assigned resources, or to prompt the user to input a value for the property, the process properties comprising properties relating to personnel, equipment, environment, materials and/or consumables;
  (ii) to create a record of the process property value so calculated or input; and
  (iii) to repeat steps (i) and (ii) for each process property of that process element;
c) to determine whether the process element of the master recipe is associated with a record defining resource requirements of that process element, and if so, to create in the general recipe a record of the requirement group and of each requirement in the group;
d) to repeat steps a) to c) for each record defining a process element in the master recipe;
e) to determine scheduling relationships for a process element of the general recipe so generated by the steps of:
  (i) determining whether the process element is a primary process element whose scheduling is not dependent on any secondary process element, or a secondary process element whose scheduling is dependent on a primary processing element;
  (ii) if it is determined that the process element is a primary process element, then determining the processing relationship of another process element of the master recipe with respect thereto other than any process element of the master recipe that is designated in the master recipe as a support segment;

(iii) determining whether or not the processing relationship is designated in the master recipe as a general relationship that is not specific to any site and, if so, storing data defining the processing relationship in a process/dependencies record of the general recipe; and (iv) repeating steps (i) to (iii) for each process element in the general recipe.

It will be appreciated that where it is stated herein that the method involves "determining" whether or not something is the case, for example determining whether or not a process property of a process element is a general property, this will normally involve the computer on which the program defining the method is running, looking up the record for the relevant process element in the master recipe and ascertaining whether or not a flag in the record is set, for example looking up whether or not the "general parameter" flag is set in the ProcessParameters table referred to below.

The master recipe will contain a number of process elements which can define unit operations, operations and actions. Some of the process elements will relate to process activities performed in support of the main process, for example the cleaning of equipment, buffer preparation, flushing filtration cartridges. Process elements defining such support activities may be specified in the master recipe as "support segments", and may be specific to a facility or resources associated with the process such as equipment, consumables, materials, or personnel and should be removed from the recipe when generating the general recipe. One of the initial steps will therefore be to remove such support segments in order to generate a record in the general recipe for each process element that is not a support segment.

Once all support segments have been removed from the recipe, it is necessary to save process property values relating to general properties in such a form that is not specific to the particular site, scale or assigned resources of the operation. This may involve determining whether or not a transform relationship exists for converting the process property value from one form to another, for example converting a buffer volume employed in a chromatography column specified in liters to one specified in column volumes (CVs). If no such transform relationship is defined the method may move to a step of generating an error log or other note that no relationship exists or alternatively prompting the user to input a relationship.

In addition to determining whether the process element is associated with resource requirements and saving the relevant requirement, the method may include the step of determining whether any process element has a requirement that is associated with a capability of the site for example, but not limited to, provision of utilities, handling of waste streams, containment of specialised material, grading of room cleanliness, access for equipment and materials and personnel, available floor area, and saving data relating to any such capability requirement.

The determination and storage of any capability may be performed after step b) and before step c), although it is not necessary for steps b) and c) and the determination and storage of any capability to be performed in any particular order. Similarly, although it is preferred for steps a) to d) and also step e) of the method according to the invention to operate on the process elements in the order of unit operations followed by operations and then by actions, it is possible for the unit operations, operations and actions to be operated on in any order.

Once the property values, requirements and capabilities have been saved, a recipe exists which is not dependent on any processing facility, equipment, consumables etc but no scheduling relationships have been specified. These scheduling relationships may depend on particular equipment or on the facility etc and so new relationships must be generated by proceeding through each scheduling dependency to determine which process element is independent of the others, and specifying the relationship of any dependent process element that is specified in the master recipe as a general relationship. The result of the method according to the invention is a general recipe containing process elements that have only general process values, which excludes any process elements that are specific to the facility, equipment, personnel or materials unless necessary for the general recipe, and in which the scheduling capabilities or relationships have been adjusted if necessary to the existence of only general process elements, and the omission of any process operations defined in the master recipe as "support Segments" that are specific to the resources employed in the process.

Once a general recipe has been created according to the invention, it is possible, if desired, to use the general recipe to create a further master recipe by assigning site and scale specific resources such as equipment, consumables, materials and personnel to the process. The selection of site-specific resources should match resource requirements associated with the general recipe upon which the new master recipe is based. The transformation may also require additional process elements to be added to the process recipe if the allocated resources are associated with support segments. According to yet another aspect of the invention, there is provided a computer program, for example stored on a carrier, comprising computer-implementable instructions that will cause a computer to perform a method according to the invention.

One form of method in accordance with the present invention will now be described by way of example with reference to the accompanying drawings in which:

FIG. 9 shows typical values in a process parameters file of a master recipe;

FIG. 10 shows typical values in a process parameters file for a general recipe corresponding to that shown in FIG. 9 after the master recipe has been converted to a general recipe;

FIG. 11 shows typical values in a process parameters file for a master recipe corresponding to that shown in FIG. 10 after the general recipe has been converted to a different master recipe;

Figure 1:
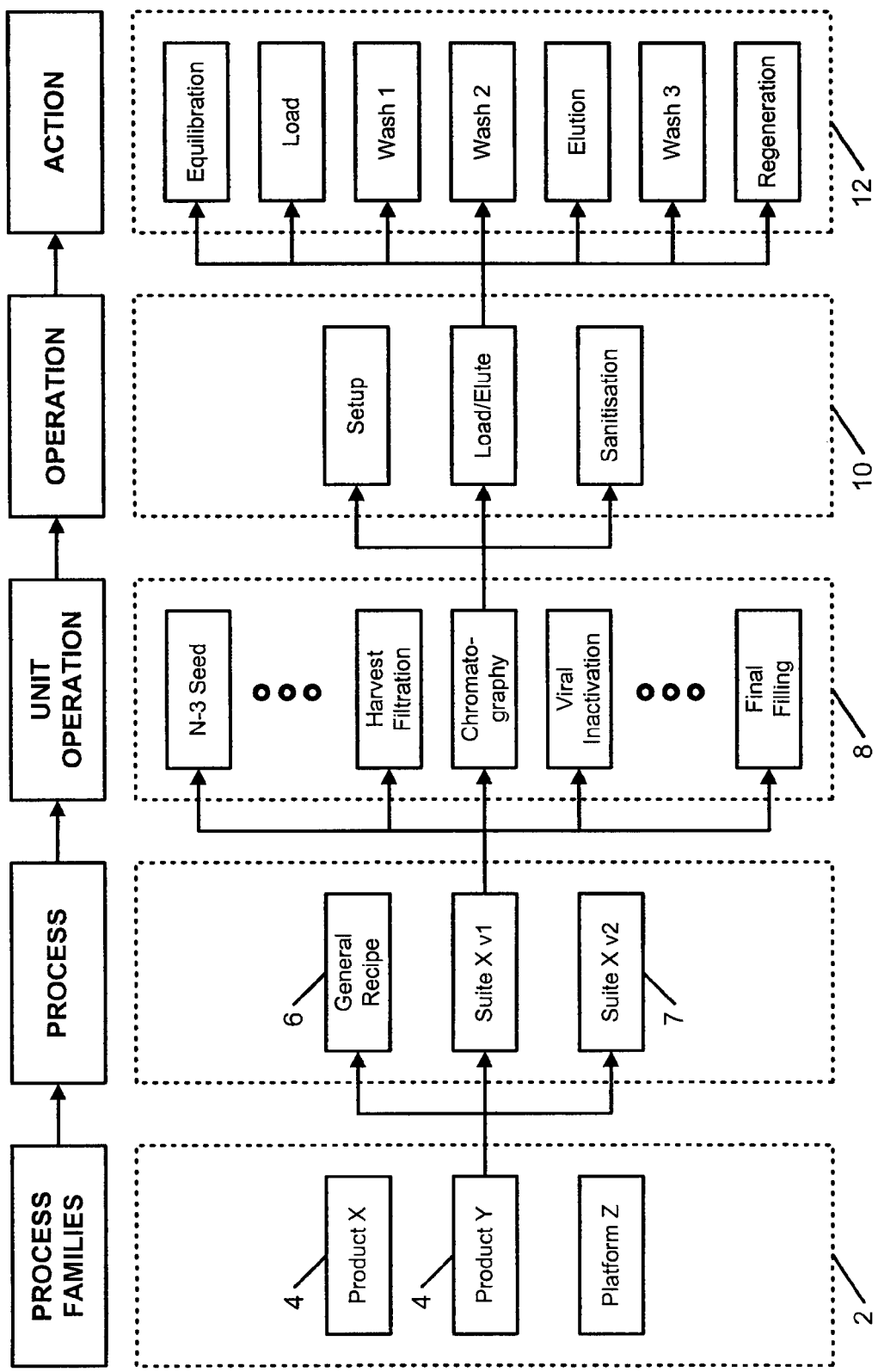
FIG. 1 is a representation of the process hierarchy of a process specified by ANSI/ISA-S88.

Referring to the accompanying drawings, FIG. 1 shows the process hierarchy of a batch process which may be described by ANSI/ISA-S88.01. The method according to the present invention may be employed for many different industrial processes, for example in the manufacture of traditional pharmaceuticals, food and drink, automobiles, and electrical devices, but is described herein by way of example in relation to a biopharmaceutical process.

At the highest level 2 a number of process families may be specified that may be made by an enterprise. The process family will normally specify all products 4 of the same general type that will be manufactured by the enterprise at all its facilities. Below the process family level is the process level in which the various recipes are specified. The recipes will include a general recipe 6 for each of the products specified in the process family which is not specific to the site or resources, and master recipes for each version or variant of the product manufactured at each of the sites of the enterprise.

Each process of recipe may be broken down to a number of elements, the more complex of which are referred to as unit operations 8. These may specify steps such as seeding a batch, harvest filtration, chromatography, viral inactivation, or final filling. For other processes, unit operations may include Cell lysis, homogenisation, centrifugation, bioconversion, diafiltration, concentration, sterile filtration, two phase separation, chromatography, depth filtration, bio-burden reduction, ultrafiltration, microfiltration, spray drying or formulation. Each unit operation is split into a number of operations 10 of lesser complexity, for example, as shown in the drawing, for chromatography the operations may comprise setting up the equipment, loading and eluting followed by sanitisation. Each operation may be broken down into a number of actions which are relatively minor processing steps such as equilibration, loading the relevant vessel, washing and elution.

Figure 2:
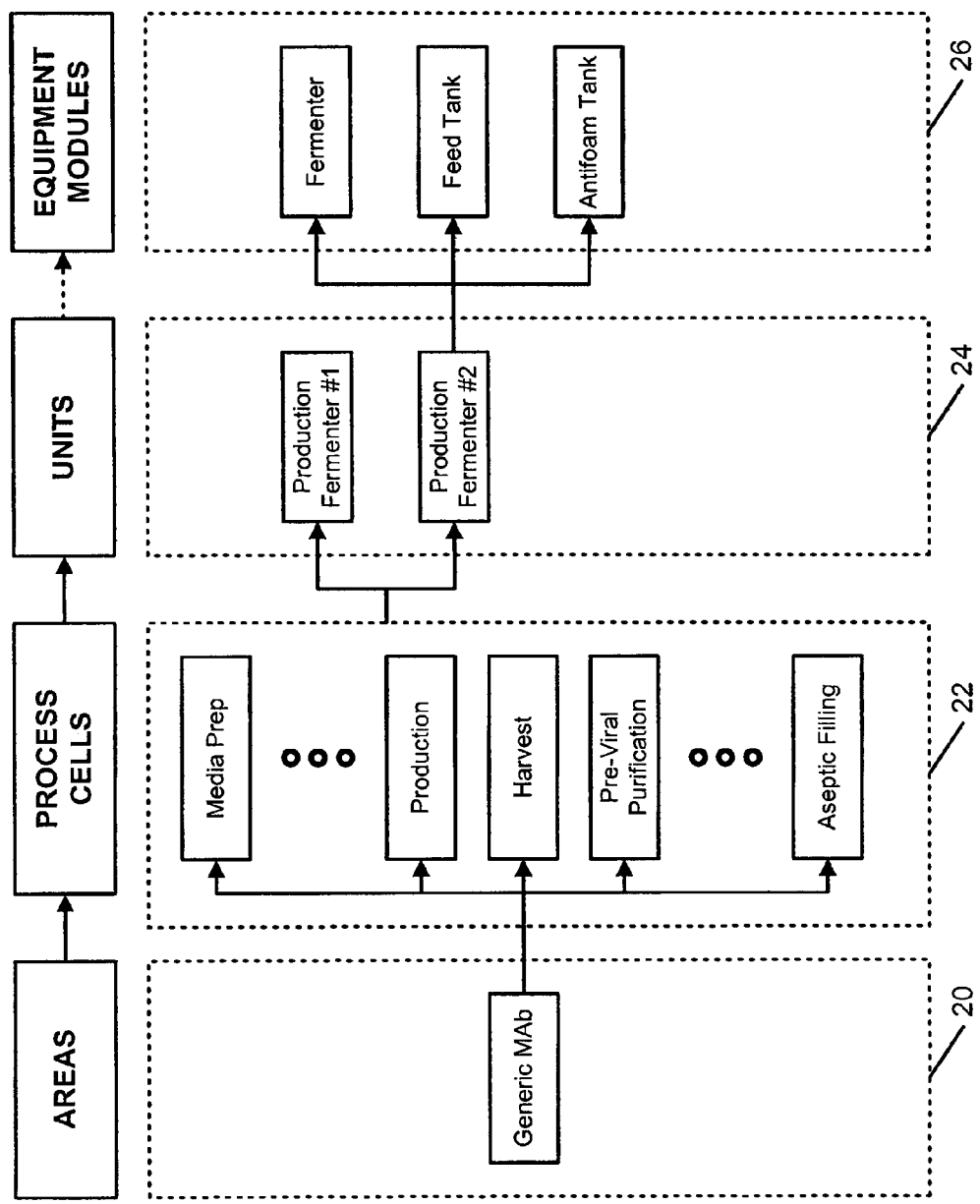
FIG. 2 is a representation of the hierarchy of a facility and equipment employed in the process of FIG. 1.

As well as a hierarchy of processing operations, a hierarchy of equipment may be specified as shown in FIG. 2. Thus a production site of an enterprise may contain a number of areas 20 which are normally based on organizational criteria and which generally have well defined capabilities and capacities. Each area is divided into a number of process cells 22 which comprise all trains, units, equipment and control modules required to make one or more batches of product, and orchestrates all process activities for a batch. As shown, a process cell may control the media preparation, production of a product, harvesting, purification, aseptic filling and the like. Each process cell may be divided into a number of units 24 that are made up of equipment modules 26 and which operate independently and perform one or more major processing activities on a complete batch for example reacting, making a process solution etc. The equipment modules 26 each perform minor processing operations such as fermenting a batch.

Figure 3:
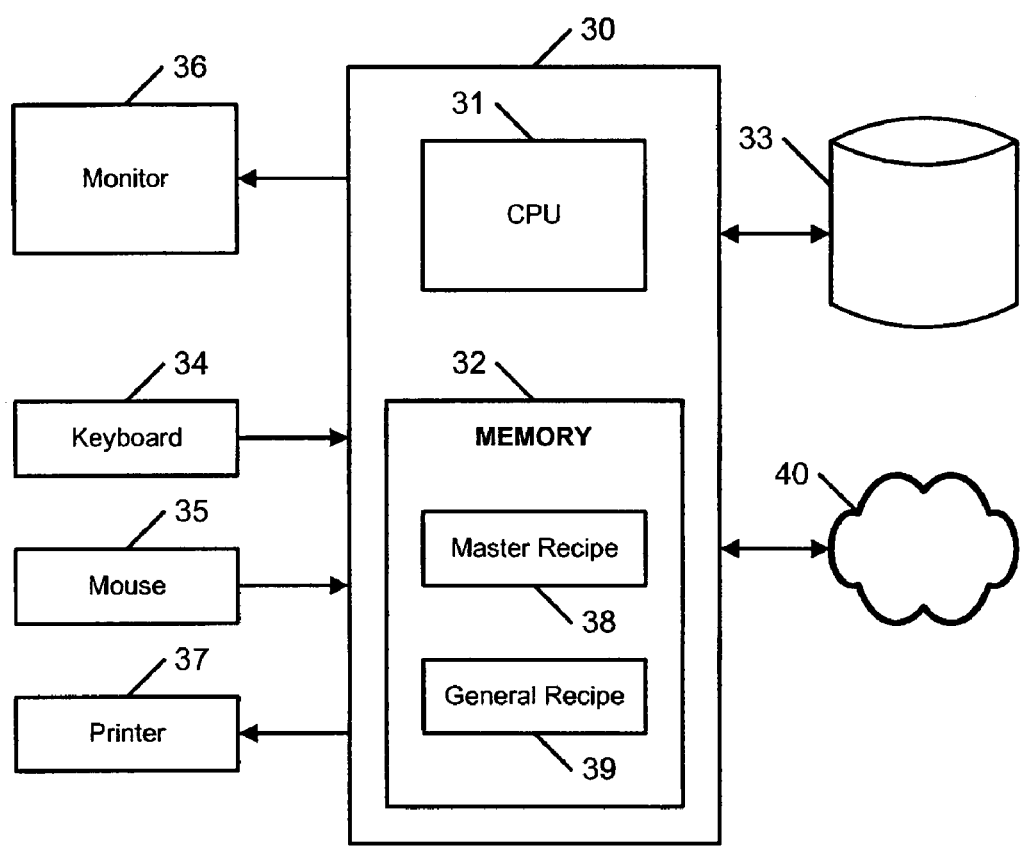
FIG. 3 is a schematic view of a computer programmed according to the invention, on which the method may be run.

FIG. 3 is a schematic view of a computer that has been programmed in order to perform the method according to the invention. A conventional computer 30 has a central processing unit 31 that is able to access memory 32 and also a separate database 33 on which the various recipes and any other data may be stored. Operation of the computer may be controlled by a keyboard 34 and/or mouse 35, and output from the computer may be sent to a monitor 36 and printer 37. Although the transformation process may be performed in any appropriate manner, the data defining the master recipe will typically be loaded from the database 33 into cache memory 32, before transformation and will be written to the database 33 only once the transformation has been successfully completed. This allows faster and safer operation since reading from the memory will be quicker, data can be checked before it is written to the database 33 and a crash will be less likely to corrupt data in the database. Alternatively, the data can be read from or written to other equipment via a network 40. The data is shown simply as comprising files forming a master recipe 38 and a general recipe 39, although the structure of the data will be as described below.

Figure 4:
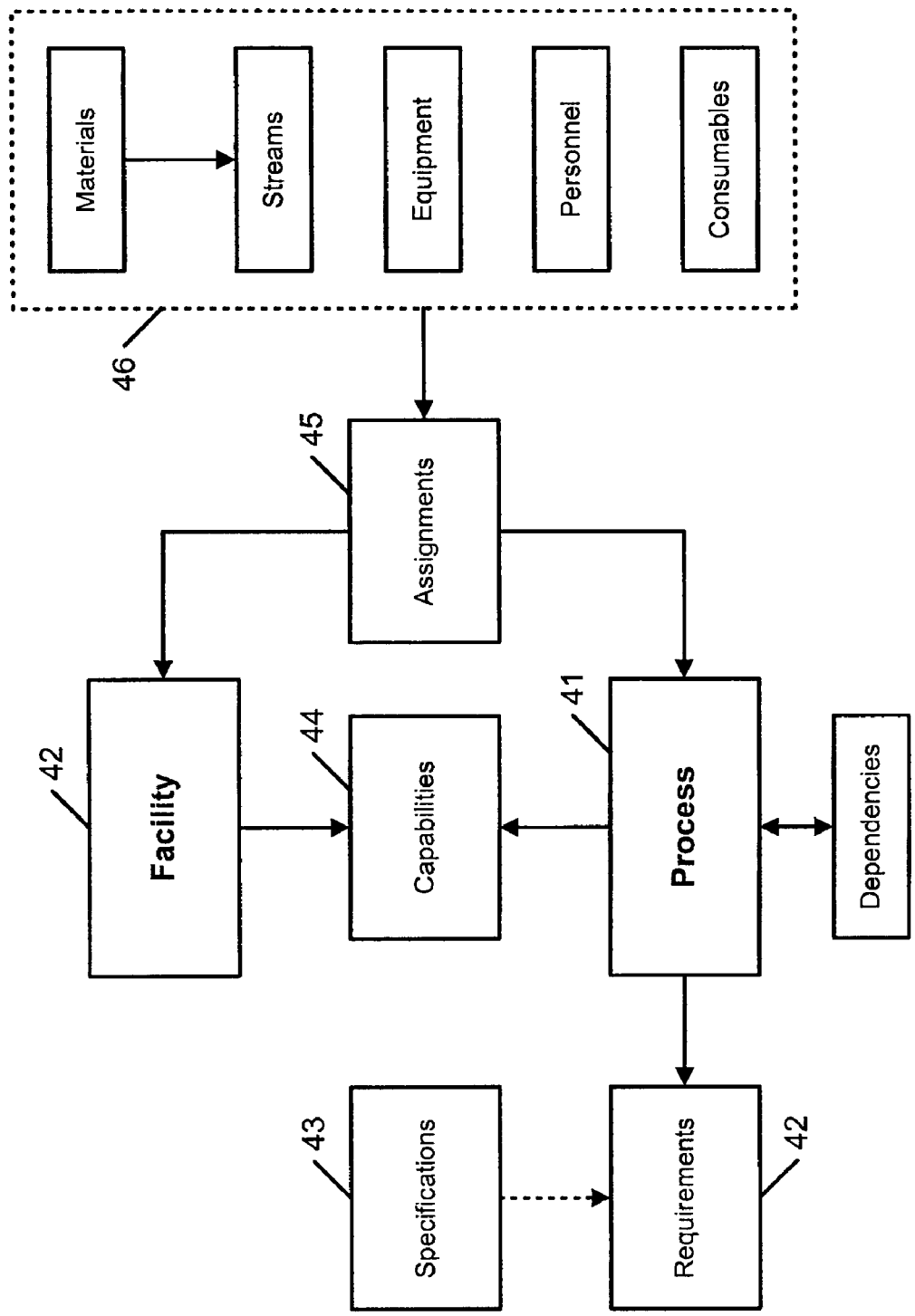
FIG. 4 is an overview of the relationships of databases used to define the process of FIG. 1.

The relationship between the various databases of a master recipe is shown in FIG. 4. The master recipe defining the process 41 will normally have a number of requirements for resources in terms of equipment, consumables and personnel that are stored in a requirements file 42 that may generally specify a bare minimum of resources that are required for the process step. Specifications 43 define valid range of specific parameters associated with the required resource. For example a requirement might exist for a chromatography column, and a specification could be added to define a minimum and maximum column height that is suitable. The recipe may specify a capability 44, which is a special type of requirement that is not linked to specific resources. Facility elements can be associated with high level capabilities, for example a suite may have the capability to be used to manufacture microbial based products. As part of the transformation from a general to a master recipe, the procedures may need to check that the capabilities required by the process can be met by the facility. The recipe can also call an assignments file 45 that specifies the resources 46 in terms of materials, equipment, personnel and consumables that are needed that may have been chosen for the process step when the master recipe is created. The resources will need to be removed from the recipe insofar as they relate to equipment or personnel in order to convert a master recipe to a general recipe. Insofar as the resources relate to consumables or materials, vendor-specific descriptions should be replaced by general descriptions.

Figure 5A:
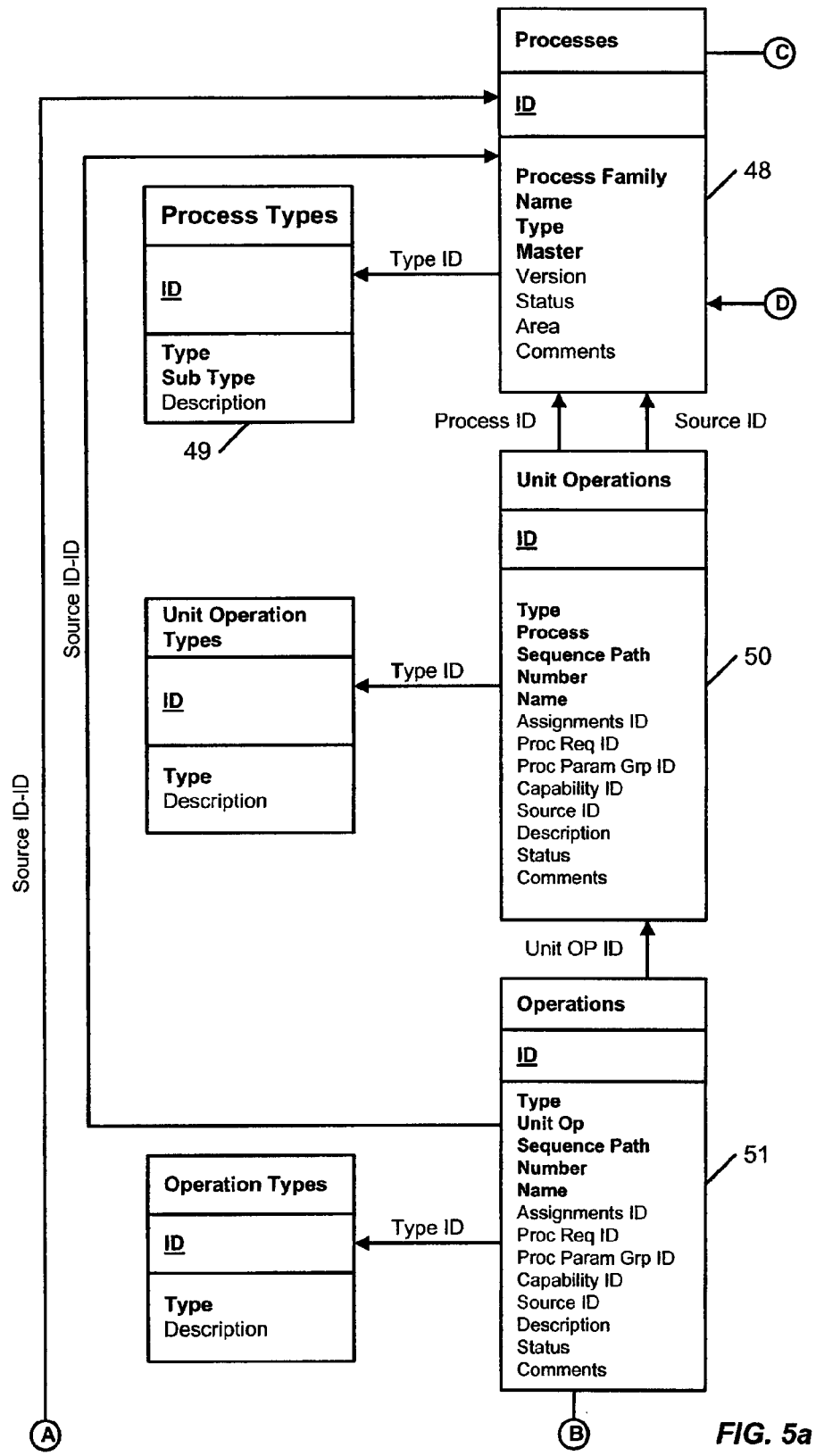
FIG. 5 is a view in greater detail of some of the files employed in the recipe of the process of FIG. 1.
Figure 5B:
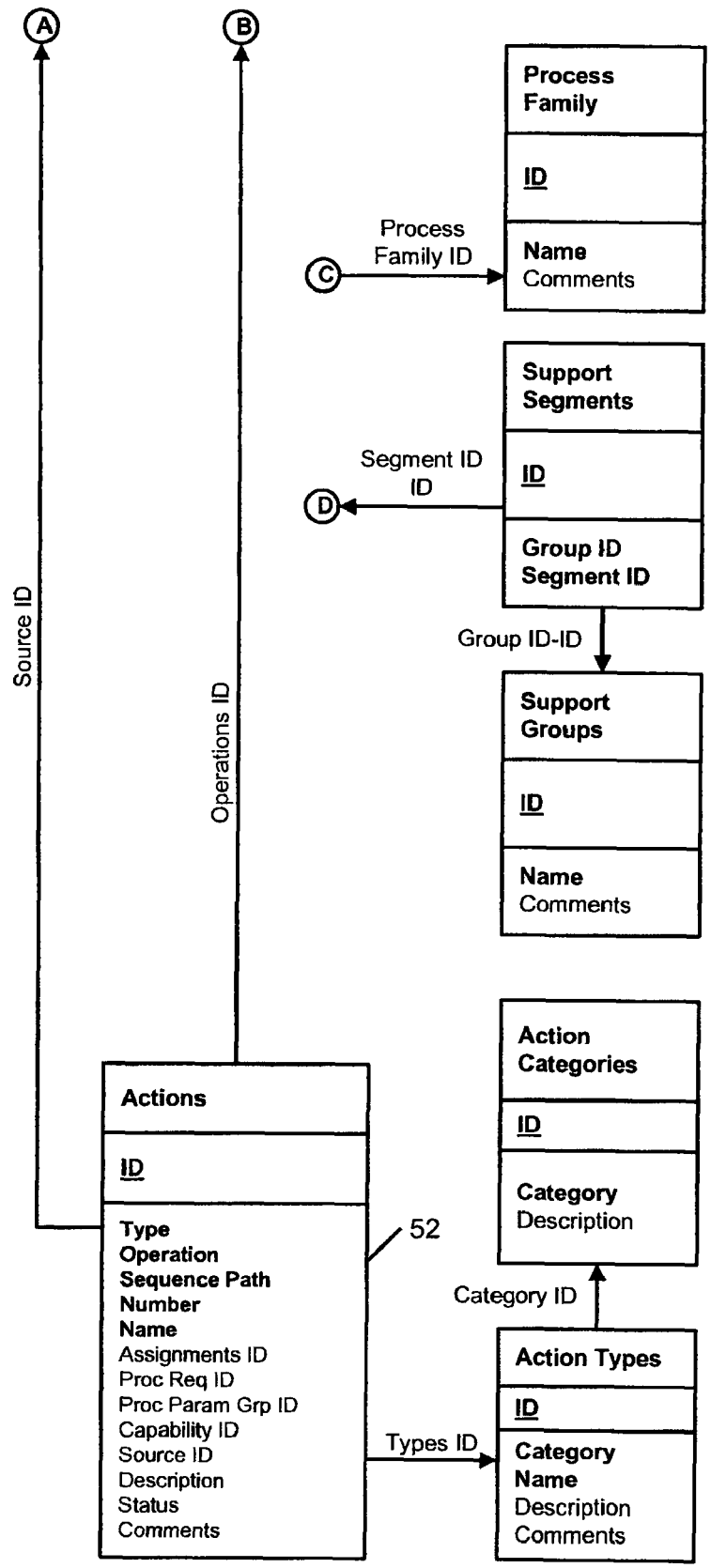

FIG. 5 shows the main files of the process hierarchy that form the master recipe that is operated on by the process according to the invention. Each master recipe has a process file 48 comprising an identifier (ID), a process family name, and a "type". The type field may specify whether the process file relates to a recipe, a segment of a recipe, or a support segment of the recipe. The process file may refer to a process types file 49 which may include a sub-type field which may specify whether the process is microbial, mammalian, or whether it relates to media prep, buffer prep, clean in place (CIP), steam in place (SIP) or the like. A number of further files 50, 51 and 52 are also present, file 50 relating to unit operations, file 51 relating to operations, and file 52 relating to actions, the unit operations file 50 specifying the process to which it relates, the operations file 51 specifying the unit operations file to which it relates, and the actions file 52 specifying the operations file 51 to which it relates. The unit operations file will typically specify under the type field whether it is a batch fermentation, fed-batch fermentation, centrifugation, depth filtration, chromatography, ultrafiltration-diafiltration, dilution or virus inactivation or the like. This list of actions is not exhaustive or limited to any predefined list specified in the program. The user may include his own unit operations in the file appropriate to his technology. Similarly, the operations file 46 may specify the type of operation as being preparation, process, post processing, cleaning or sanitisation, while the actions file may specify the type as being add (material), remove, flow, process, hold, change conditions, equipment start up or equipment shutdown.

Figure 6A:
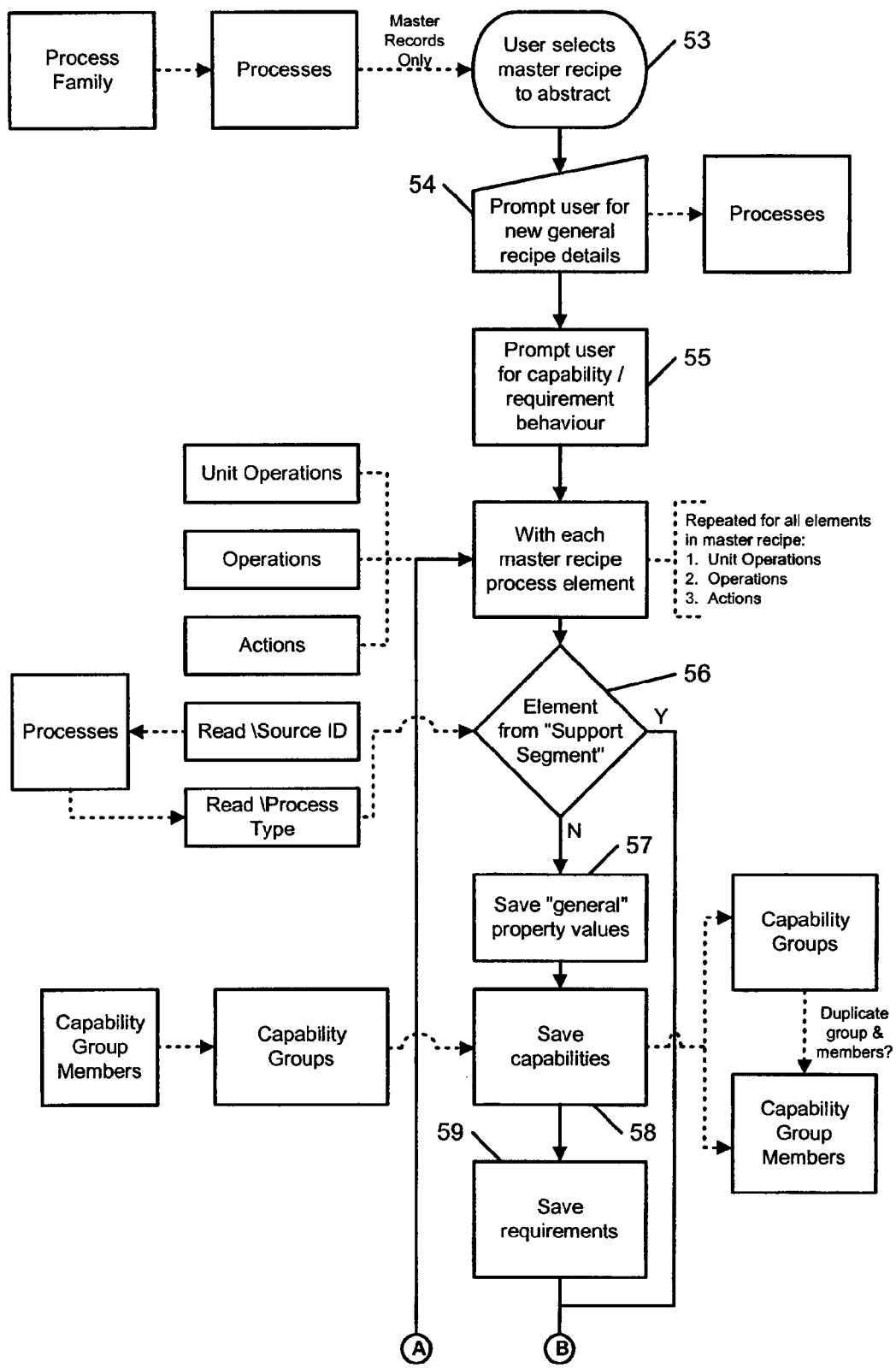
FIG. 6 is a flow diagram of the method according to the present invention.
Figure 6B:
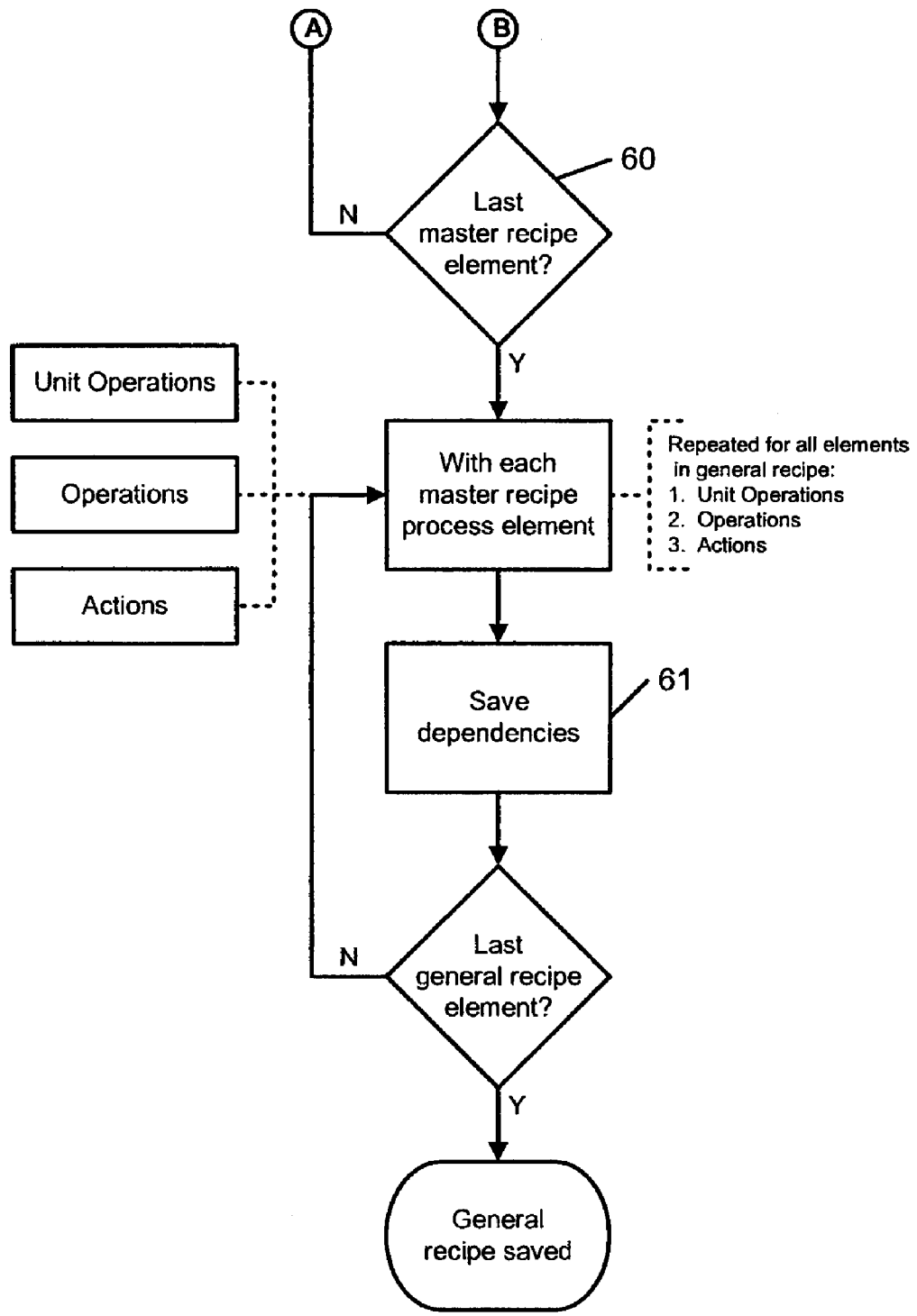

FIGS. 6a and 6b are flow diagrams showing the overall method according to the invention, for converting a master recipe to a general recipe, and indicating which files are called by the various method steps. In the flow diagrams, boxes that are joined by solid lines refer to process steps, while those that are joined to other boxes solely by dotted lines refer simply to data files that may be called on in the process steps.

The method essentially comprises five steps:
(1) removal of resource assignments from the master recipe.
(2) removal of specific process scale information.
(3) separation of any "support segments" from the process activities.
(4) generalisation of existing process requirements, or the creation of new requirements if none exist in the master recipe.
(5) generalisation of process scheduling dependencies in the master recipe.

Dealing initially with these steps in turn:

Removal of Resource Assignments from the Master Recipe.

Since general recipes are not associated with any site specific equipment, consumables, personnel, or materials, these should be removed from the recipe when converting the master recipe to a general recipe. If any particular resource is required, for example a piece of equipment from a certain vendor, then this would be expected to be saved in the general recipe as a requirement in addition to the assignment.

Removal of Specific Process Scale Information.

Master recipes are defined for operating a process using specified equipment at a given scale. General recipes therefore need to be saved in a manner that is independent of the resources to be used and the scale of operation.

It is expected that in many cases, processes will be defined as master recipes by the user. As a result, input values may be given for specific cases rather than using scale-less alternatives. As part of the abstraction process creating the general recipe it will therefore be necessary to calculate general parameters or to prompt the user to provide such parameters in place of specific values.

General parameters will be calculated using transform relationships, sometime referred to as "action transform relationships". If a relationship required to calculate a general parameter is not specified, the user interface may need to warn the user and log the error. In order for the process to be completed successfully the required transform relationships should be defined.

Separation of Any "Support Segments" from the Process Activities.

A master recipe is likely to include a number of process activities, whether unit operations, operations or actions, that are specified as "support segments". These segments are related to the operation, setup or cleaning of specific resources. For example a process may require a clean vessel to be used but the exact procedure for cleaning the vessel is determined by the vessel itself and not by the process.

As part of the abstraction method, any activities related to such support segments should be removed. In the database structure, such support segments may be saved as a specific type of process. When a support segment is used in creating a master recipe, any process elements added to the new master recipe may be flagged as having been drawn from the specified support segment process, that is to say, all process records will include a "type" flag that indicates whether the record is a process or a support segment (or forms part of a support segment). By querying the status of the data field holding this information it will be possible to determine whether any given process element was originally added as part of a support segment.

Support activities not specified in the master recipe as part of a support segment cannot be recognised as such, and should therefore be assumed to be an intrinsic part of the process. As a result, any support activities not originally specified as a support segment and added to the master recipe will not be removed during the abstraction process.

Generalisation or Creation of Process Requirements.

Requirements for resources can be associated with any process element. Requirements can be made for any resource type (for example equipment, consumables, personnel, materials, or environmental conditions). Each requirement can be associated with any number of specifications that define the acceptable values of properties associated with the required resource, e.g. vessel volume.

Existing requirements can be carried over to the general recipe as part of the transformation process. However, the specifications may be set for specific equipment or scale properties. In such cases, the specifications should not be carried over into the general recipe. General resource properties will not be calculated from specific values.

Generalisation of Existing Process Dependencies.

The master recipe is likely to contain a number of scheduling relationships between different process elements. For example one unit operation could be set to start no later than 24 hours after a specific action in a preceding unit operation. In many cases the dependencies can be carried over to the general recipe. However, some of the dependencies may reflect scheduling issues linked to the implementation of the process at the specific facility.

Any dependencies relating to process elements added to the master recipe as support segments will not be carried over to the general recipe.

The database design allows users to mark dependency relationships as being "general" when defining them. Any relationships set up in this manner will be retained. If no "general" relationships are flagged, then no scheduling dependencies will be carried over into the general recipe.

The abstraction method of forming the general recipe starts at step 53 when the user selects a particular master recipe to "generalise". For this step, the method will need to access the processes records and the process family records, and, for obvious reasons, only master records are accessed. The user will be prompted to enter optional details about the process such as a name, the current version and the status at step 54. This data can be edited at a later date after the transformation. A new record will be added to the processes table.

Before the transformation can start, the system should confirm the behaviour to be followed when processing the capability and the processing requirements at step 55. The system can either prompt the user each time he/she initiate a transformation, or use a saved preference. Both capability and process requirements are specified in groups of one or more individual requirements. One or more process elements can be linked with each requirement group. When transforming requirements associated with the master recipe the system can either refer to the existing groups in the new general recipe, or create new groups and duplicate the associated requirements. In the former case the existing master recipe and the new general recipe would share common capability and process requirements—editing the requirements in one process would also change the other.

Rather than edit the existing process records, the user interface may create a new general process record and selectively transfer or duplicate data from the existing master recipe. The transformation process will work through the process elements in sequence through steps 56 to 60.

The transformation process preferably works down the process hierarchy starting with unit operations, followed by operations and actions in turn, duplicating the relevant operations to the general recipe being created. It is possible, however, for the process steps to be operated on in any other order.

As stated above, the master recipe is likely to contain elements associated with facility-specific activities, which may be additional unit operations, operations, or actions, and are specified as "support segments". These segments are then added to the master recipe. At step 56, it is determined whether any process elements is flagged as being drawn from a support segment, and if so, the procedure passes directly to step 60 without duplicating the support segment to the general recipe being created.

For each process element that will be duplicated, the procedure will need to generate the required records in the process data tables (UnitOperations, Operations, Actions) and populate the ProcessParameterValues table with general values at step 57.

Figure 7A:
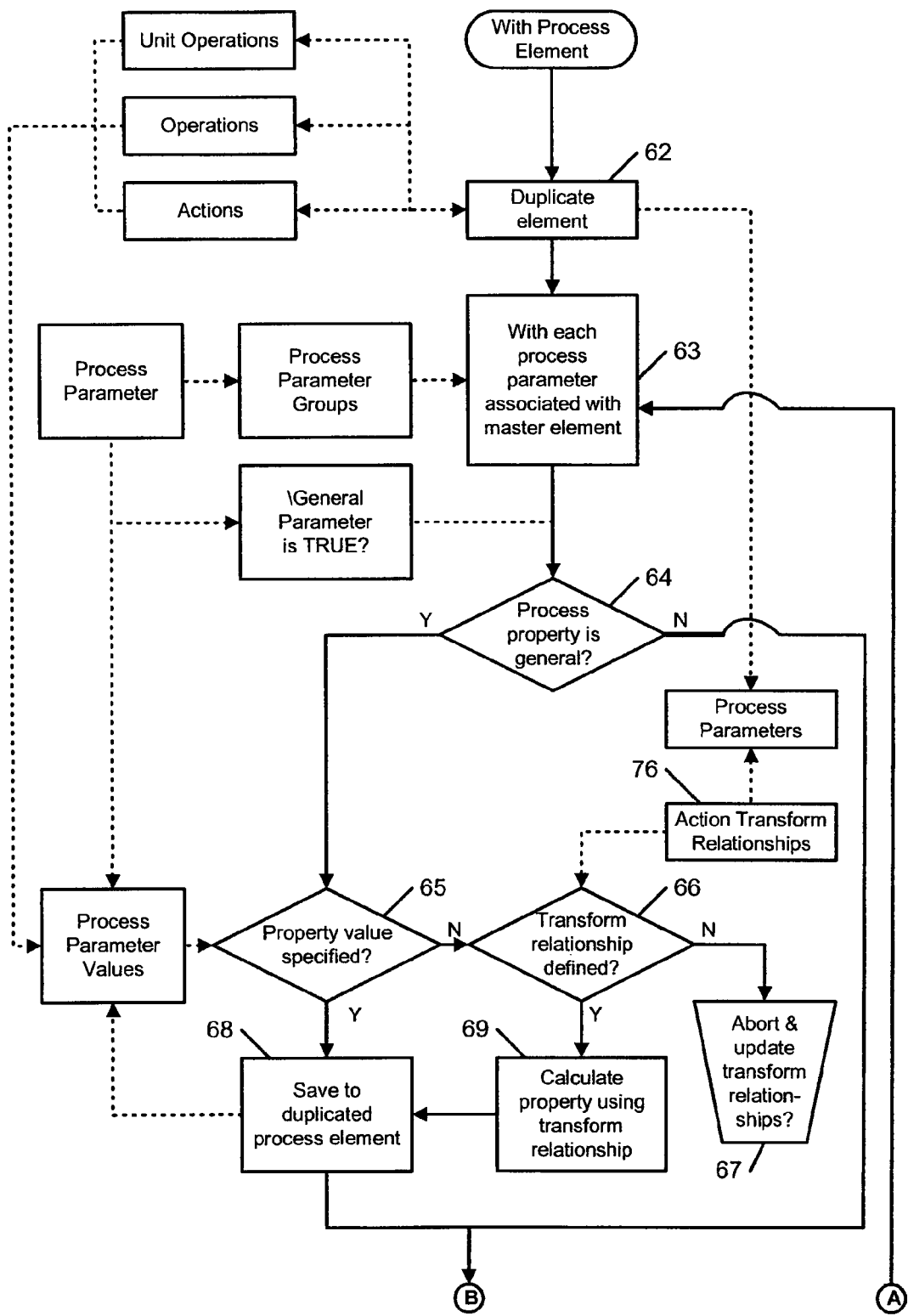
FIG. 7 is a flow diagram of the step of saving general property values in FIG. 6 in greater detail.
Figure 7B:
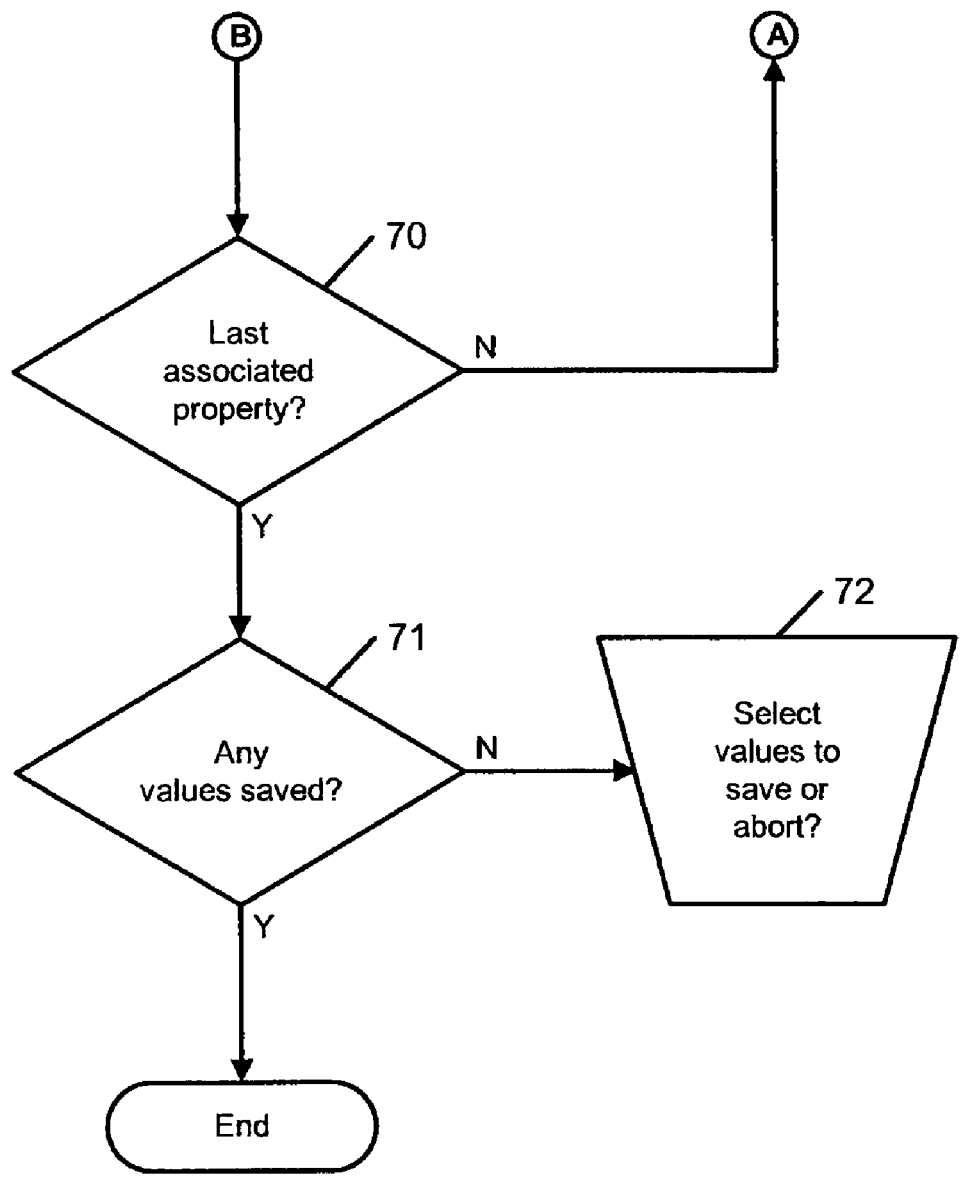

This step is shown in greater detail in FIGS. 7a and 7b. In this operation, a duplicate of the master recipe process element is added to the new general process at step 62. At this point only the basic process property value information is added to the UnitOperations, Operations, or Actions table depending on the process element currently selected. The resource assignments, capabilities, requirements and dependencies associated with the master recipe element are processed separately.

Each process element is likely to be associated with a number of process properties, of which some values will be specified by the user while others must be calculated using the action transform relationships. The process proceeds through each process parameter associated with the master element (step 63) accessing the process parameter groups from the processParameters table, and queries whether or not the general parameter flag in the processParameters table is true in step 64. Each of the process properties associated with the process element in the master recipe is queried in turn to check what values should be carried over into the new general recipe. The process properties associated with the process element are determined by the type of process element and are defined in the ProcessParameterAssociations table.

If the process property is flagged in the master recipe as "general" (step 64), that is to say, one that is not specific to the site, consumables, equipment, personnel or materials, then the system checks to see if the value has been specified directly by the user at step 65. If the value was specified and saved to the database, then a duplicate of the record will be added to the ProcessPropertyValues table associated with the current process element in the general recipe (step 68).

If the value of a general process property has not been defined (step 65), then the value must be calculated from the information available. If an action transform relationship exists that indicates how the general value can be determined (step 66), then a calculation engine may be called in order to evaluate the relevant value (step 69). The calculated general process property value can then be saved to the general recipe being created (step 68) in a new record in the ProcessPropertyValues table associated with the current process element in the general recipe. If no suitable action transform relationship has been defined, then the user will be warned that the transformation cannot be completed at step 67.

The option exists either to abort the transformation at this point, or to log the error and continue. If the transformation process is continued, the error log can be used to generate a list of tasks that the user must complete before re-starting the process, for example adding missing transform relationships. In either case, the user may update the action transformation relationships defined in the database, or manually override the duplication of the property values at step 72 before the transformation process can be completed. If an error is encountered the general recipe will not be saved, and any records added to the database will be deleted. Records will only be retained if the transformation is completed without any errors.

If the process property is the last one associated with the current process element, (determined at step 70), the system will determine if any values were saved to the general recipe (step 71). If no values were saved, the user will be asked to specify manually which of the property values saved in the master recipe should be carried over to the general recipe at step 72. If the user does not wish to use any of the master recipe property values the transformation process can be aborted. This review process will normally only be required if the user has not correctly specified the action transform relationships and has chosen to proceed with the transformation despite any warnings given at step 67.

Figure 8:
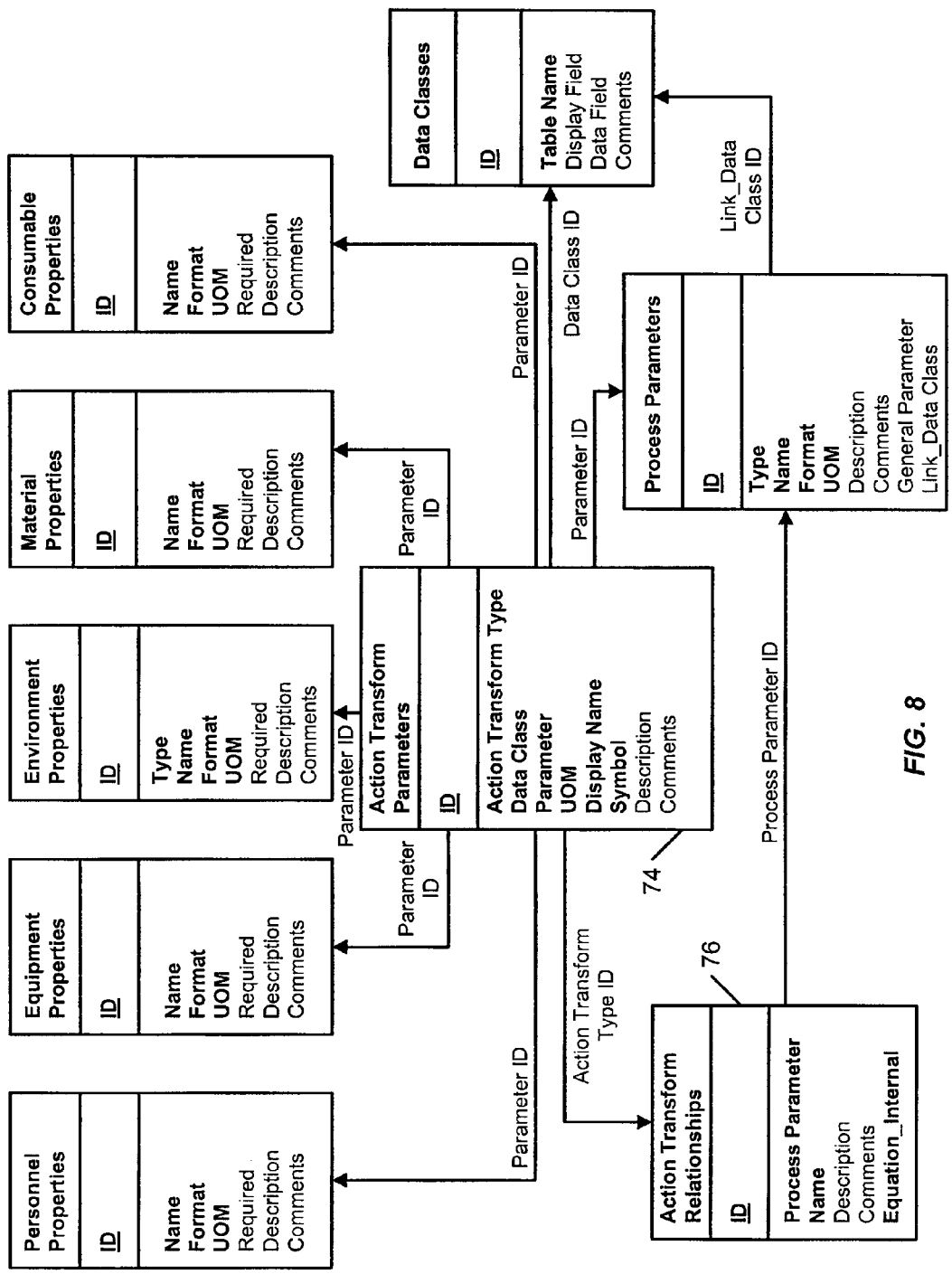
FIG. 8 is a view showing some of the files employed for transforming process parameters from a master recipe to process parameters for a general recipe.

FIG. 8 shows a number of files that may be employed in order to transform parameters from those employed in a master recipe to those employed in a general recipe in step 69 of FIG. 7. The different relationships used to calculate process parameters are stored in the ActionTransformRelationships table 76. Each relationship details how a single process parameter can be calculated from any combination of process parameters and/or equipment, consumables, material, personnel and environmental properties. Alternative relationships can be defined for a single process parameter. The table includes a field for the process parameter, i.e. the ID of the process parameter calculated by the relationship taken from the ProcessParameters table, the name, i.e. a user defined name for the relationship e.g. "Chromatography Bed Volume", a description of the relationship, e.g. "Calculate bed volume from selected column diameter and min/max bed height data", and an internal equation that is a string used to store the equation relating to the transformation. An ActionTransformParameters table 74 stores the input parameters for the relationship. This table may include an action Transform Type field which is the ID of the relationship that the parameter or property is referenced in, a Data Class field indicating the type of parameter or property to be referenced, for example "equipment", "personnel", "environment", "consumable" or "material", the units of measurement that will be used in the relationship, the display name, a unique symbol used to identify the property/parameter in the relationship, for example "CV" for "Column Volumes", a description of the property or parameter, and any user comments. In addition, the table can be used to look up other process parameters, for example the ProcessParameters table. This table includes a field for any action record entitled "General Parameter" which can be true or false, and thus determines whether or not the record for the process action is general. It will be appreciated that this field may be located elsewhere in the database.

FIG. 9 shows an example of the data that may be stored in the ActionTransformParameters table of a master recipe, in this case relating to a chromatographic column. In this case, the values for the bed height, the product fraction (liters), the buffer volume (liters), and the volumetric flow rate (liters/hour) have been specified by the user when generating the initial master recipe, while values given in italics, for example values for the bed volume (liters), product fraction (CVs) buffer CVs, linear flowrate, step duration (hours) and waste volume (liters) have been calculated. The Process requirements record is empty because the equipment used in the process was listed by the user as an assignment when the master recipe was created.

FIG. 10 shows an example of the data of FIG. 9 once the conversion of the process parameters to general units has been performed by the calculation engine using the ActionTransformRelationships table. Here the assignments field is now empty and the Process Requirements field has been populated. In addition, certain of the process parameters have been deleted and other parameters have been specified in terms that are not specific to the equipment, having been calculated from assignments in the master recipe. Data specified in general units, for example column volumes, can be calculated by means of standard equations stored in the ActonTransformRelationships table 76. Only those specifications related to general recipe parameters, e.g. "Bed Height" in this case have been retained. Typically, transformed processes would require the same materials and chromatography resins to be specified as in the master recipe, although they may be specified in terms that are not specific to any vendor if desired.

FIG. 11 is an example of the data once converted from the general data given in FIG. 9 to site specific form for another master recipe employing different equipment. Here the process requirements are the same as shown in FIG. 9 for the general recipe, but the process parameters field has been populated again with data using specific units, and the assignments field has been populated by the user as part of the general to master transformation.

Returning to the flowchart of FIG. 56 if the duplicated process element was linked to any capability requirements, these will be replicated in the general recipe (step 58). Capabilities and requirements are specified as "groups". Any process element is then linked to the group. Each group may contain any number of capabilities and requirements. When duplicating the capabilities and requirements associated with a process element, the existing group can be used, or a new duplicate group can be added. The user will be asked at the start of the transformation if he/she wishes to link the capabilities and requirements associated with the new general recipe to the source master recipe, or if new independent files for capabilities an for requirements should be created. The system will default to the latter.

After the capabilities have been duplicated to the general recipe in step 58, the existing process requirements (and associated specifications) will be duplicated and carried over to the general recipe in step 59. However, any specifications that refer to non-general resource properties will not be duplicated. If no process requirements have been specified the software will use the master recipe resource assignment information to generate a basic set of process requirements that the user can subsequently edit after the completion of the transform process.

Process requirements are specified as "groups". Process elements are linked to the group which in turn is linked to one or more individual requirements. When duplicating the process requirements associated with a process element the existing group can be used, or a new duplicate group be added. The user will be asked at the start of the transformation if he wishes to link the requirements associated with the new general recipe to the source master recipe, or if an new independent requirements file should be created. The system will default to the latter.

Figure 12A:
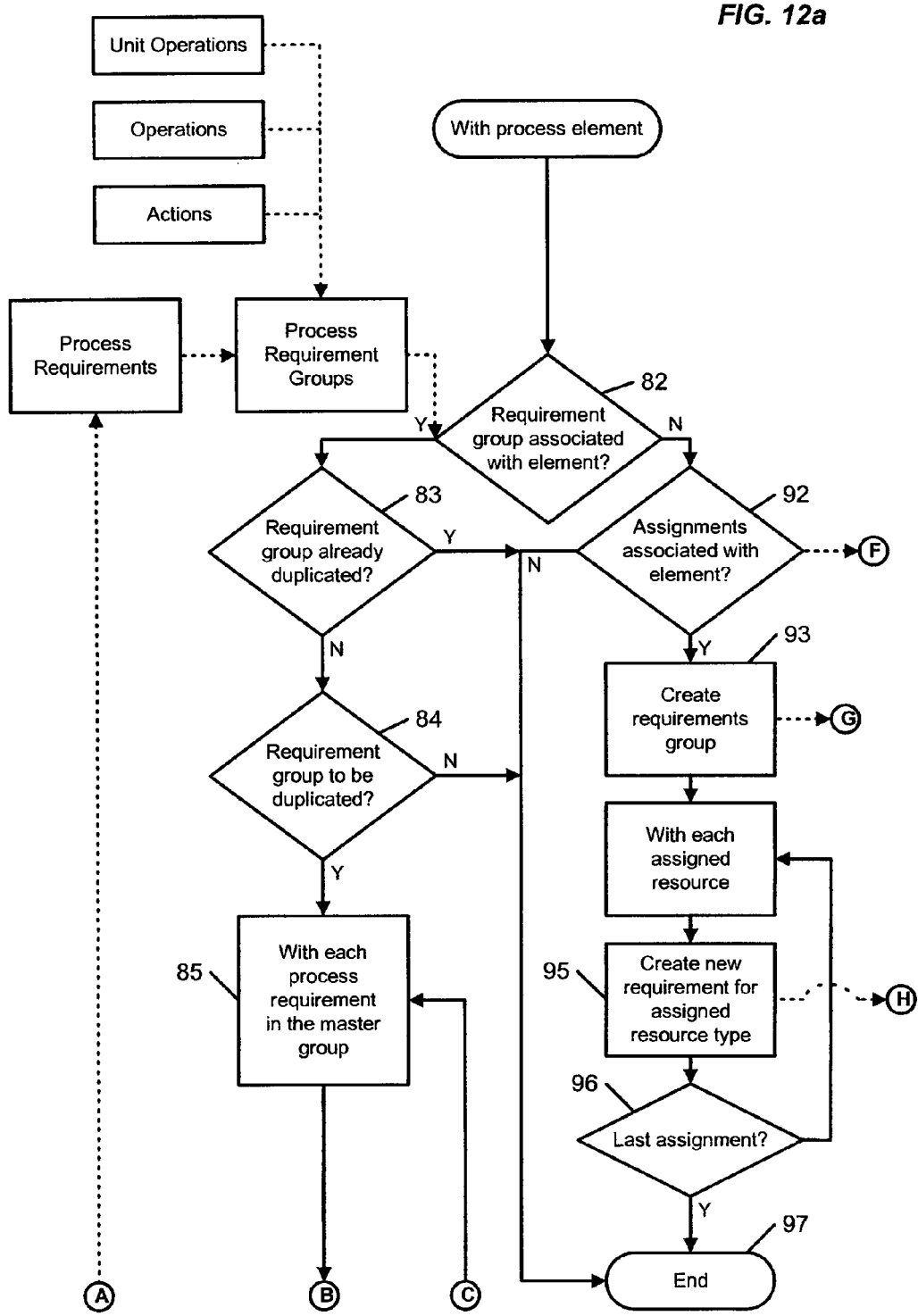
FIG. 12 is a flow diagram of the step of saving requirements shown in FIG. 6 in greater detail.
Figure 12B:
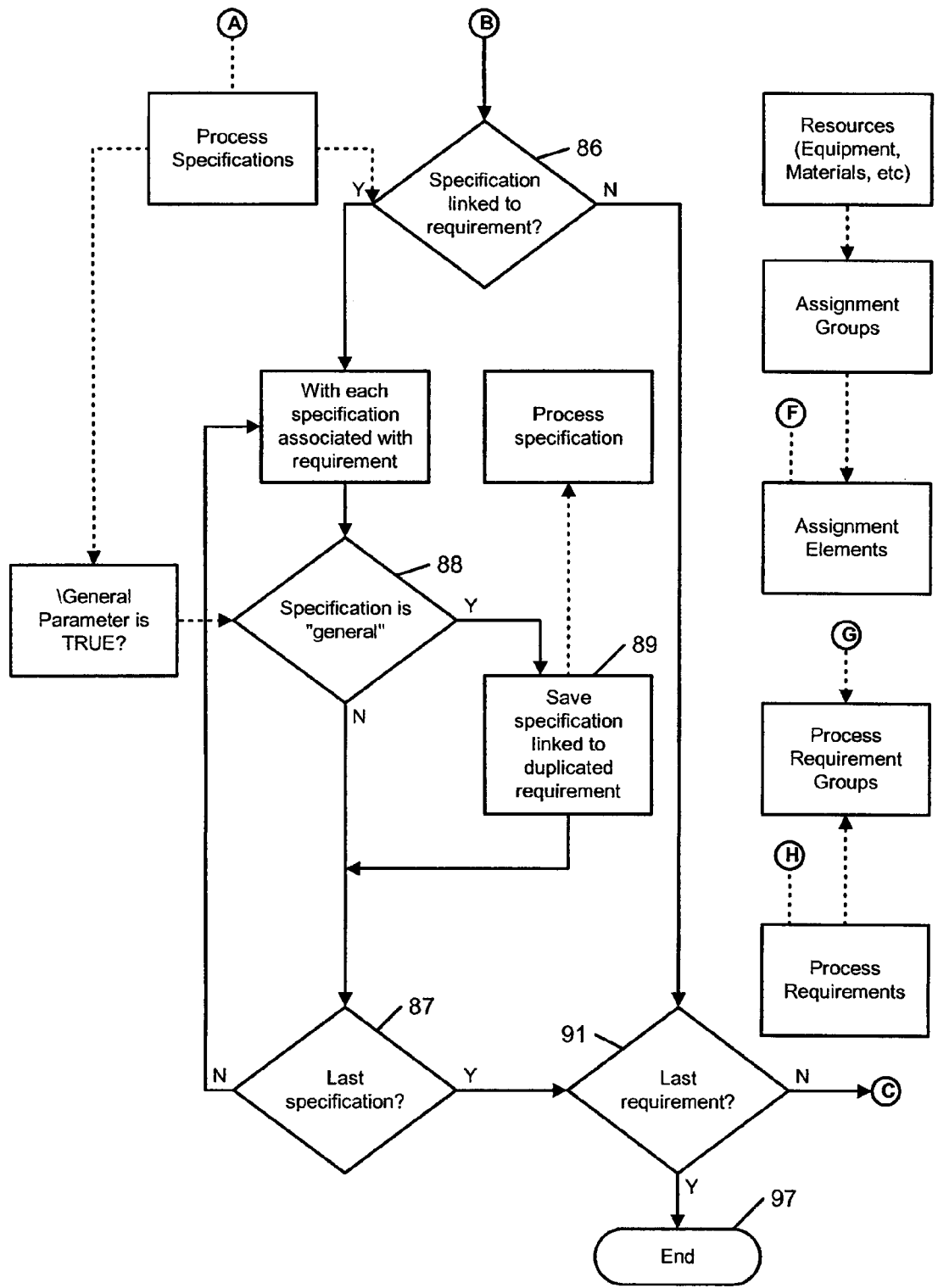

Step 59 of saving the requirements is shown in greater detail in FIGS. 12a and 12b. Each master recipe process element included in the general recipe will be processed to determine what process requirements should be added to the general recipe. For every process element the system first checks to see if the process element is associated with any records in the ProcessRequirementGroups table (step 82). Each requirement group can be referenced by more than one process element within the same process. The system checks to see if the same requirement group was associated with another process element that has already been processed (step 83), and if so, it will not be duplicated again. Instead the system will progress directly to the next transformation task (step 97).

If the process element is associated with a requirement group that has not been processed already, then the group will be duplicated (step 84). Duplication of the requirement group will add records to the ProcessRequirementGroups table and to the ProcessRequirements table. A single record will be added to the former, while one record will be added to the latter for each requirement within the group. The general recipe process element will then be updated to associate it with the new requirement group.

Once the tables have been updated, the system will review each individual requirement within the group in turn (step 85). If the requirement is not linked to any specifications, then the system will move on to the next requirement in the group (step 86). If the requirement is associated with one or more specifications, then each will be processed in turn until all the specifications have been reviewed (step 87). Each specification is specified as a record in the ProcessSpecifications table.

The ProcessSpecifications table includes a flag to indicate whether the specification is general or specific to the application. The flag is determined as to whether or not it is set (step 88), and if the flag is set, then the specification is general and can be carried over to the new requirement (step 89). If the specification is not general, then the system will move on to the next specification. Each specification will be reviewed in turn until the last specification linked to the requirement has been processed (step 89).

Duplication of the process requirements linked to a process element continues until all requirements in the process requirements group have been reviewed (step 91).

If the process is not linked to a requirement group (step 82) then the system will generate a set of requirements based on the current assignments. The procedure then determines whether or not assignments are linked to the process element (step 92). In the unlikely event that there are no assignments linked to the process element then the handling of process requirements is complete (step 97).

If the process element is linked to assignments in the master recipe, a new process requirement group will be created (step 93). For each assignment linked to the process element (94) the system will create a new requirement (step 95). Each new requirement will be added as a record in the ProcessRequirements table. The new requirements will be set to match the resource type assignments, e.g. "chromatography column". No specifications will be added at this time, but the user will be able to modify the general recipe once the transformation is complete. The conversion of the assignments into requirements will continue until all the resource assignment records linked to the process element have been processed (step 96). At this point the system will move on to the next transformation task (step 97).

Figure 13:
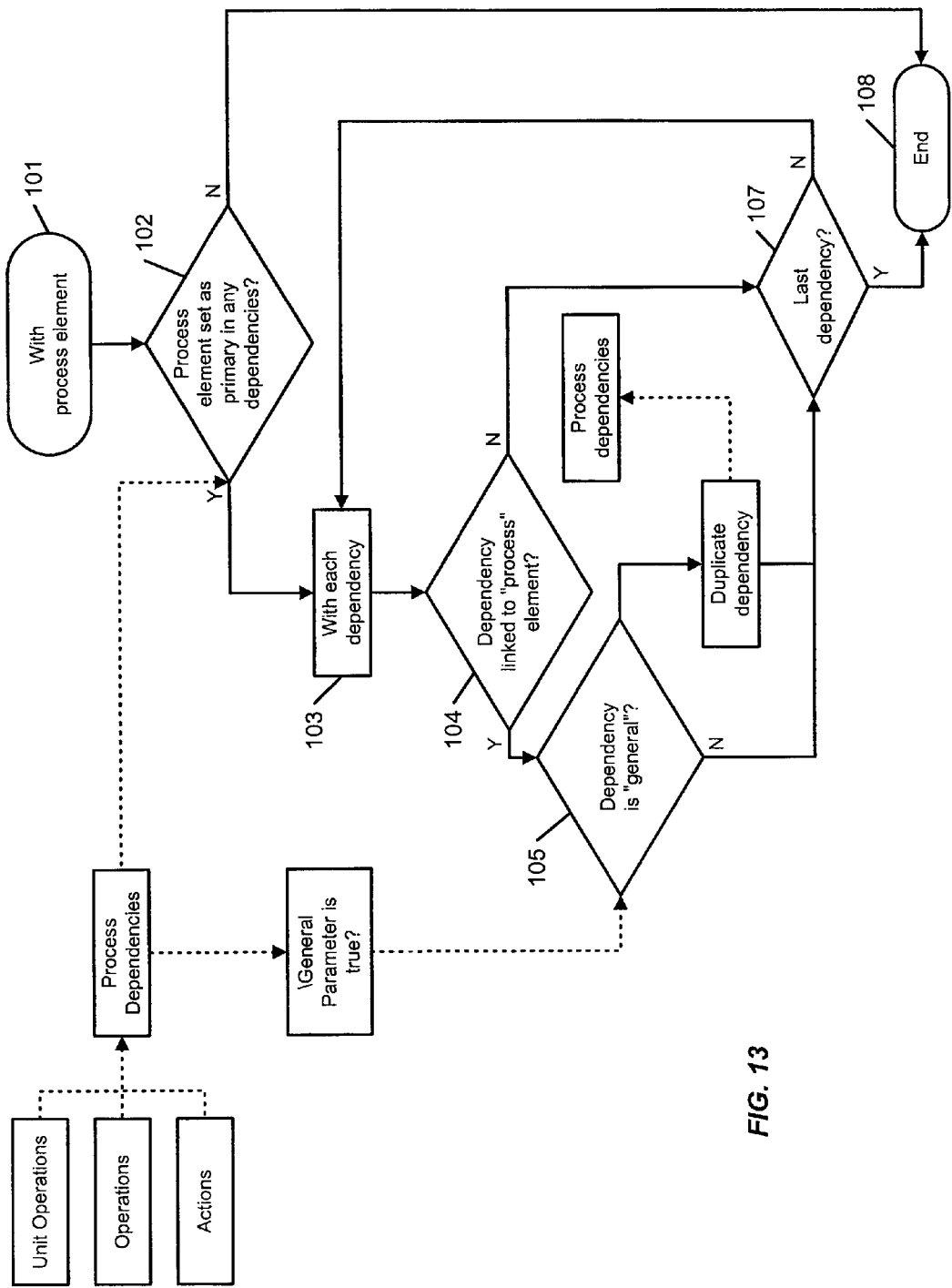
FIG. 13 is a flow diagram of the step of saving scheduling dependencies in FIG. 6 in greater detail.

At this stage, a general recipe has been created that does not refer to any site specific resources, but the scheduling of the various unit operations, operations and actions is still as specified in the master recipe, and so the system will need to save the scheduling dependencies (step 61 in FIG. 6) in a form appropriate to the general recipe. This is shown in greater detail in FIG. 13.

Each master recipe process element included in the general recipe will be processed to determine what scheduling dependencies should be added to the general recipe (101). The evaluation of the scheduling dependencies is performed separately from the other tasks as the removal of the support segments from the master recipe could have an impact on the dependencies.

The process information includes basic sequencing data, for example that a particular operation is the second within the unit operation. The removal of the support segments may result in the sequence data being altered. In the above example the first operation within the unit operation may not be carried over to the general recipe, and therefore what was previously the second operation in the unit operation sequence will have become the first. In order to account for this, the system will need to know how the master and general recipe process elements are mapped to one another so that the appropriate elements can be referenced when duplicating the master recipe data.

Process dependencies are specified for pairs of process elements: a primary and a secondary element. The secondary element is scheduled relative to the primary element. Different relationships define the dependency. For example a secondary unit operation can be specified to start one day after the primary unit operation. An example of a file that may form the ProcessDependencies table is shown in FIG. 9. Each ProcessDependencies table includes an identifier (ID), and specifies two process elements, element 1 and element 2, by their ID and the dependency type, for example that element 2 starts with element 1. The element type for each element is specified, namely whether the element is a unit operation, operation or action. In addition, the offset is specified, for example the period of time after element 1 has started or finished before element 2 starts. Other fields that are optional include the requirements of each element, units of measurement and comments.

Figure 14:
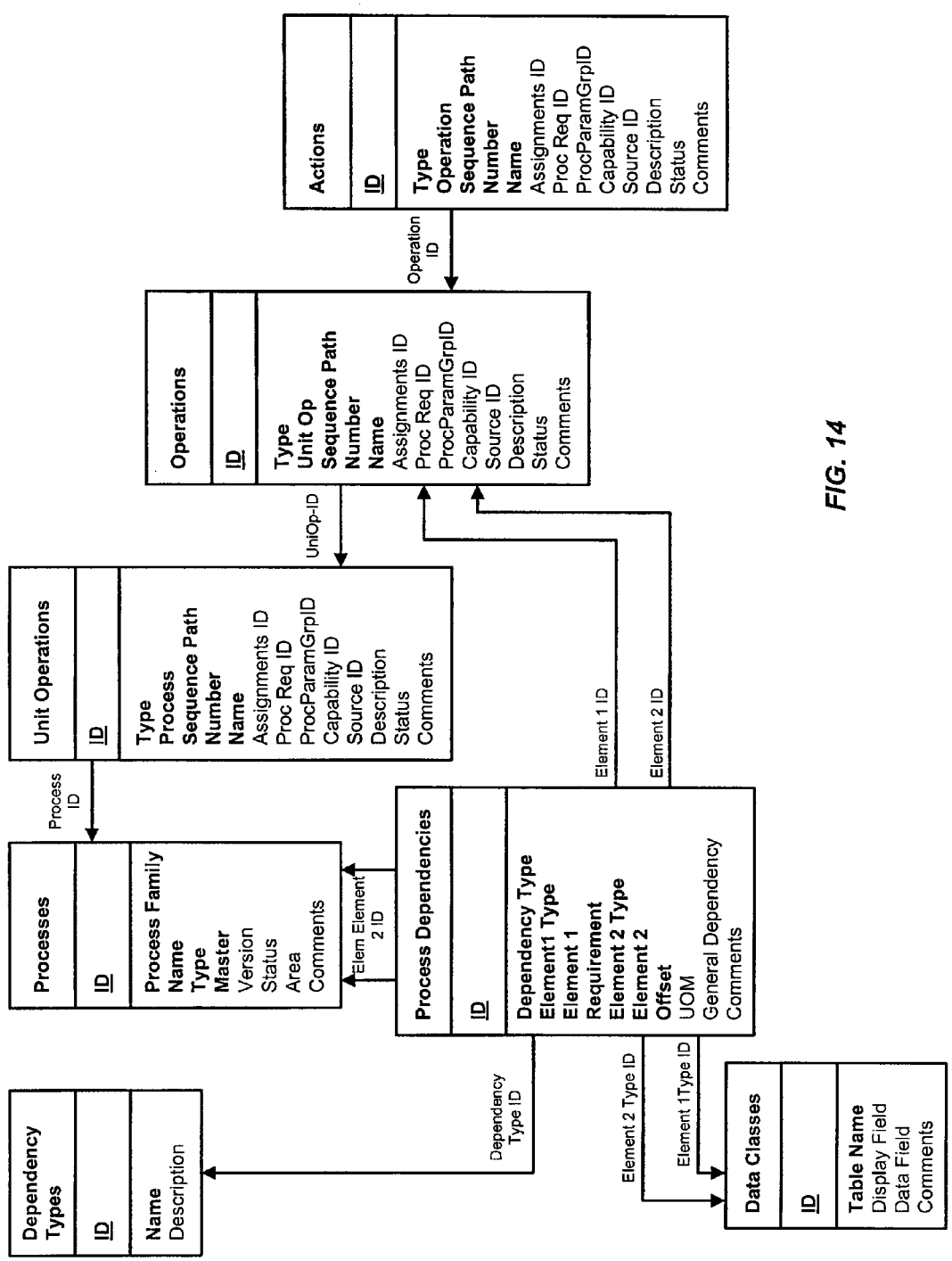
FIG. 14 shows some of the files employed in the flow diagram of FIG. 13.

Referring to FIG. 14, the ProcessDependencies table is queried by the system at step 102 to determine whether the master recipe element related to the current general recipe process element is specified as the primary element in any dependencies. If the element is not specified in any dependencies, then it does not need to be duplicated at step 108.

If the master recipe element related to the current (general recipe) process element is included as a primary element in any scheduling dependencies, then the system should review each of these relationships in turn (103). In each case the system checks the secondary element in the relationship to determine whether it was added as a support segment or is an intrinsic part of the process (step 104). If the element was added as part of a support segment and not included in the general recipe, then the dependency is not added to the general recipe and the system will query whether this is the last dependency and, if not, move on to review the next dependency (step 107).

Not all process dependencies in the master recipe should be carried over into the general recipe. In some cases the scheduling relationship may reflect operational practices or constraints peculiar to the facility linked to the master recipe. In these cases the relationships should not be included in the general recipe. In contrast, a general dependency should be included in the general recipe.

The definition of each dependency defined in the ProcessDependencies table includes a field that marks the dependency as being "general". The purpose of this flag is to take into account the dependence or otherwise of certain processes on others. For example, in some facilities, depending on equipment, some reactions may be performed in parallel whereas in other facilities they may only be performed sequentially. The state of this flag is queried by the system at step 105 to determine whether or not the relationship should be included in the general recipe. If the flag is set, then a new record is added to the ProcessDependencies table and linked to the general recipe process elements. Otherwise the system will move on to review the next dependency (step 107).

Handling of the process dependencies is completed once all the dependencies have been reviewed where the master recipe element related to the current process element is set as the primary element in the relationship.

The invention claimed is:

1. A method of generating a general recipe that comprises process elements describing an industrial process that is not specific to a site at which the process is conducted and scale of operation, or to consumables, equipment or personnel employed in the process, from a master recipe that comprises process elements of the industrial process that is specific to the site and scale of operation or to consumables, equipment or personnel, the master recipe comprising records defining process elements forming the process, the method comprising:
   a) determining whether a process element of the master recipe is a support segment that relates only to resources assigned to the master recipe, the resources being consumables, material, or equipment used in the process, and generating a record in the general recipe for each process element of the master recipe that is not a support segment;
   b) for each process element of the master recipe that corresponds to a process element of the general recipe:
      (i) determining whether or not a process property of that process element is designated in the master recipe as a general property, and if so, calculating a process property value for that process property that is not specific to the site, scale of operation, or assigned resources, or prompting the user to input a value for the property, the process properties comprising properties relating to personnel, equipment, environment, materials and/or consumables;
      (ii) creating a record of the process property value so calculated or input; and
      (iii) repeating steps (i) and (ii) for each process property of that process element;
   c) determining whether the process element of the master recipe is associated with a record defining resource requirements of that process element, and if so, creating in the general recipe a record of a group of the requirements and of each requirement in the group;
   d) repeating steps a) to c) for each record defining a process element in the master recipe;
   e) determining scheduling relationships for a process element of the general recipe so generated by the steps of:
      (i) determining whether the process element is a primary process element whose scheduling is not dependent on any secondary process element, or a secondary process element whose scheduling is dependent on a primary processing element;
      (ii) if it is determined that the process element is a primary process element, then determining a process relationship of another process element of the master recipe with respect thereto other than any process element of the master recipe that is designated in the master recipe as a support segment;
      (iii) determining whether or not the processing relationship is designated in the master recipe as a general relationship that is not specific to any site and, if so, storing data defining the processing relationship in a process/dependencies record of the general recipe; and (iv) repeating steps (i) to (iii) for each process element in the general recipe.

2. A method as claimed in claim 1, wherein step b) (i) includes determining whether or not an action transform relationship exists for converting the process property value designated in the master recipe to a value that is not specific to the site, scale of operation of assigned resources, and if so, using the action transform relationship to perform a conversion and storing the value so generated in the record of the process property.

3. A method as claimed in claim 2, wherein if no action transform relationship exists, an error log is generated.

4. A method as claimed in claim 1, which includes the step of determining whether or not a requirement of the process element is associated with a capability of the site, and if so generating in the general recipe a record of the capability of the site relating to the requirement of the process element.

5. A method as claimed in claim 4, wherein the step of generating a record of the capability of the site is performed after step b) and before step c).

6. A method as claimed in claim 1, wherein steps a) to d) are performed initially for each unit operation of the process element, followed by each operation of the process element, and then for each action in the process element.

7. A method as claimed in claim 1, wherein step e) is performed initially for each unit operation of the process element, followed by each operation of the process element, and then for each action in the process element.

8. A method as claimed in claim 1, which includes the step of determining what resources are assigned to any process element in the master recipe, and removing those resources from the record of the process element in the general recipe or prompting the user to specify a resource requirement in the record of the process element of the general recipe.

9. A method as claimed in claim 1, wherein the calculation in step b) (i) is performed by a calculation engine into which data defining the process property values, personnel property values, equipment property values, material property values and consumable property values associated with the process element in the master recipe are input, the calculation engine having a transform record that defines a relationship between the property values specified in the master recipe and the general property values to be saved to the general recipe.

10. A method of generating a first master recipe that comprises process elements describing an industrial process, the master recipe being specific to a site and scale of operation at which the process is conducted, or to consumables, equipment or personnel employed in the process, from a second master recipe that is specific to a different site or scale of operation or to different consumables, which comprises generating a general recipe from the second master recipe according to claim 1, and then forming the first master recipe from the general recipe.

11. A method of producing a product, comprising the steps of generating a first master recipe for the production of the product from a second master recipe according to claim 10, and operating an industrial scale process for the production of the product in accordance with the first master recipe so generated.

12. A device for generating a general recipe that comprises process elements describing an industrial process that is not specific to a site at which the process is conducted and scale of operation, or to consumables, equipment or personnel employed in the process, from a master recipe that comprises process elements of the industrial process that is specific to the site and scale of operation or to consumables, equipment or personnel, the master recipe comprising records defining process elements forming the process, the device comprising:

a) a module for determining whether a process element of the master recipe is a support segment that relates only to resources assigned to the master recipe, the resources being consumables, material, or equipment used in the process, and generating a record in the general recipe for each process element of the master recipe that is not a support segment;

b) a module that is operable to read the record of each process element of the master recipe that corresponds to a process element of the general recipe, and is operable:
(i) to determine whether or not a process property of that process element is designated in the master recipe as a general property, and if so, to calculate a process property value for that process property that is not specific to the site, scale of operation, or assigned resources, or to prompt the user to input a value for the property, the process properties comprising properties relating to personnel, equipment, environment, materials and/or consumables;
(ii) to create a record of the process property value so calculated or input; and
(iii) to repeat (i) and (ii) for each process property of that process element;

c) a module that is operable to determine whether the process element of the master recipe is associated with a record defining resource requirements of that process element, and if so, to create in the general recipe a record of a group of the requirements and of each requirement in the group;

d) a module that is operable to repeat steps a) to c) for each record defining a process element in the master recipe;

e) a module that is operable to determine scheduling relationships for a process element of the general recipe so generated by:
(i) determining whether the process element is a primary process element whose scheduling is not dependent on any secondary process element, or a secondary process element whose scheduling is dependent on a primary processing element;
(ii) if it is determined that the process element is a primary process element, then determining a process relationship of another process element of the master recipe with respect thereto other than any process element of the master recipe that is designated in the master recipe as a support segment;
(iii) determining whether or not the processing relationship is designated in the master recipe as a general relationship that is not specific to any site and, if so, storing data defining the processing relationship in a process/dependencies record of the general recipe; and
(iv) repeating (i) to (iii) for each process element in the general recipe.

13. A device as claimed in claim 12, wherein the module defined in b) is operable in (i) to determine whether or not an action transform relationship exists for converting the process property value designated in the master recipe to a value that is not specific to the site, scale of operation of assigned resources, and if so, to use the action transform relationship to perform a conversion and storing the value so generated in the record of the process property.

14. A device as claimed in claim 13, which is operable to generate an error log if no action transform relationship exists.

15. A device as claimed in claim 12, which includes a module for determining whether or not a requirement of the process element is associated with a capability of the site, and if so for generating in the general recipe a record of the capability of the site relating to the requirement of the process element.

16. A device as claimed in claim 15, wherein the module for generating a record of the capability of the site is operable to generate the record after b) and before c).

17. A device as claimed in claim 12, which is operable to perform a) to d) initially for each unit operation of the process element, followed by each operation of the process element, and then for each action in the process element.

18. A device as claimed in claim 12, which is operable to perform e) initially for each unit operation of the process element, followed by each operation of the process element, and then for each action in the process element.

19. A device as claimed in claim 12, which is operable to determine what resources are assigned to any process element in the master recipe, and to remove those resources from the record of the process element in the general recipe or to prompt the user to specify a resource requirement in the record of the process element of the general recipe.

20. A device as claimed in claim 12, wherein the module defined in b) is operable to perform (i) by means of a calculation engine into which data defining the process property values, personnel property values, equipment property values, material property values and consumable property values associated with the process element in the master recipe are input, the calculation engine having a transform record that defines a relationship between the property values specified in the master recipe and the general property values to be saved to the general recipe.

21. A device for generating a master recipe that comprises process elements describing an industrial process, the master recipe being specific to a site and scale of operation at which the process is conducted, or to consumables, equipment or personnel employed in the process, from a second master recipe that is specific to a different site or scale of operation or to different consumables, the device including a device according to claim 11, and a module for forming the master recipe from the general recipe.

* * * * *